United States Patent
Nonaka et al.

(10) Patent No.: US 8,126,318 B2
(45) Date of Patent: Feb. 28, 2012

(54) RECORDING DEVICE, SYSTEM, INTEGRATED CIRCUIT, PROGRAM, AND RECORDING METHOD

(75) Inventors: Masao Nonaka, Osaka (JP); Yoshiaki Iwata, Osaka (JP); Yoichi Yamamoto, Hiroshima (JP); Motoji Ohmori, Osaka (JP)

(73) Assignee: Panasonic Corporation, Osaka (JP)

( * ) Notice: Subject to any disclaimer, the term of this patent is extended or adjusted under 35 U.S.C. 154(b) by 945 days.

(21) Appl. No.: 11/660,652

(22) PCT Filed: Aug. 30, 2005

(86) PCT No.: PCT/JP2005/015700
§ 371 (c)(1),
(2), (4) Date: May 28, 2008

(87) PCT Pub. No.: WO2006/025348
PCT Pub. Date: Mar. 9, 2006

(65) Prior Publication Data
US 2009/0136209 A1    May 28, 2009

(30) Foreign Application Priority Data

Aug. 30, 2004  (JP) .................................. 2004-251018

(51) Int. Cl.
*H04N 5/76* (2006.01)
(52) U.S. Cl. ........ 386/341; 386/314; 386/323; 386/324; 386/354
(58) Field of Classification Search .................. 386/232, 386/323, 324, 354, 341; 711/120, 140, 167, 711/169
See application file for complete search history.

(56) References Cited

U.S. PATENT DOCUMENTS

| 5,974,015 | A | * | 10/1999 | Iizuka et al. ................... | 386/201 |
| 6,483,851 | B1 | | 11/2002 | Neogi | |
| 7,412,574 | B2 | * | 8/2008 | Jeddeloh ........................ | 711/158 |
| 7,692,666 | B1 | * | 4/2010 | Bourgoin et al. ............. | 345/601 |
| 2001/0038746 | A1 | * | 11/2001 | Hughes et al. ................. | 386/123 |
| 2002/0116085 | A1 | * | 8/2002 | Schaaf et al. .................. | 700/115 |
| 2003/0093799 | A1 | * | 5/2003 | Kauffman et al. .............. | 725/86 |
| 2003/0217057 | A1 | | 11/2003 | Kuroiwa et al. | |

FOREIGN PATENT DOCUMENTS

| JP | 2000-165436 | 6/2000 |
| JP | 2001-86460  | 3/2001 |
| JP | 2002-318589 | 10/2002 |
| JP | 2003-339000 | 11/2003 |
| JP | 2004-78427  | 3/2004 |
| JP | 2004-159079 | 6/2004 |

* cited by examiner

*Primary Examiner* — Nabil El Hady
(74) *Attorney, Agent, or Firm* — Wenderoth, Lind & Ponack, L.L.P.

(57) ABSTRACT

A system, which minimizes a time delay caused by one device being unable to access a recording medium until access by another device ends, when transcoding is performed by distributed processing, includes a main device transcoding each coded piece allocated to itself from among a plurality of coded pieces of a digital stream, and writing a transcoding result onto the recording medium, in a pipeline. While the recording device is performing the transcoding and the writing, an auxiliary device transcodes each coded piece allocated to itself one by one. Having completed the transcoding of all coded pieces allocated to itself, the auxiliary device transmits its transcoding results to the recording device and has the recording device write the transcoding results onto the recording medium which is a copy destination.

16 Claims, 18 Drawing Sheets

FIG.4

COPY

| CONTENT 1 | 2002 | 11/3 | CH3 | PM8:00~PM8:45 | STANDARD IMAGE QUALITY |
| CONTENT 2 | 2002 | 11/10 | CH3 | PM8:00~PM8:45 | STANDARD IMAGE QUALITY |
| CONTENT 3 | 2002 | 11/17 | CH3 | PM8:00~PM8:45 | STANDARD IMAGE QUALITY |
| CONTENT 4 | 2002 | 11/18 | CH5 | PM7:00~PM7:30 | STANDARD IMAGE QUALITY |
| CONTENT 5 | 2002 | 11/19 | CH6 | PM6:00~PM6:30 | STANDARD IMAGE QUALITY |

COPY DESTINATION

⊘ — bn1
DVD

○ — bn2
SD CARD

[↑][↓] : SELECT   [ENTER] : COPY CONTENT DETERMINATION

RECORDING DEVICE, SYSTEM, INTEGRATED CIRCUIT, PROGRAM, AND RECORDING METHOD

TECHNICAL FIELD

The present invention belongs to a technical field of transcoding, i.e. conversion of a digital stream which has been converted according to one coding format and recorded on a recording medium, into another coding format. The present invention relates to a technique of applying such transcoding to a system that includes a recording device and an auxiliary device for aiding the recording device.

BACKGROUND ART

The aforementioned transcoding technique is essential when copying a digital stream recorded on a hard disk (HD), to an optical disc or a memory card. The transcoding technique is employed in various recording devices in areas of consumer product industries.

In transcoding, a digital stream that is compression-coded by MPEG2-TS (Transport Stream), MPEG2-PS (Program Stream), or the like needs to be returned to a decompressed form first. This requires real-time processing. The real-time processing referred to here is a process that takes a processing time equal to a playback time of the digital stream. For example, transcoding of a digital stream corresponding to two-hour video requires real-time processing of two-hours.

DISCLOSURE OF THE INVENTION

Problems the Invention is Going to Solve

In distributed processing, there is a problem of how to combine results of processing by a plurality of processing entities into one. When distributing one process among a plurality of processing entities and recording data obtained as a result of this distributed processing onto a single recording medium, two processing entities will end up competing for access to the medium. In such a case, according to typical access arbitration, one processing entity needs to wait until the access by the other processing entity ends. If one processing entity receives a lower priority in this way, despite that the transcoding is performed in a distributed manner, the processing time will not be reduced to ½. That is, a time delay occurs due to one device being forced to wait until the other device writes data.

The present invention aims to provide a system that can minimize a time delay caused by one device receiving a lower priority than the other device in accessing a recording medium, when transcoding is performed by distributed processing.

Means of Solving the Problems

The stated aim can be achieved by a recording device in a system that performs transcoding on a plurality of coded pieces through-distributed processing between the recording device and an auxiliary device, a sequence of the plurality of coded pieces forming a digital stream, the recording device including: a transcoding unit operable to transcode coded pieces; and a writing unit operable to write results of transcoding by the transcoding unit onto a single recording medium, wherein simultaneously with the transcoding unit transcoding one of the coded pieces, the writing unit writes a result of transcoding an immediately preceding coded piece by the transcoding unit onto the single recording medium, and after writing the results of transcoding by the transcoding unit onto the single recording medium, the writing unit receives results of transcoding by the auxiliary device from the auxiliary device and writes the received results onto the single recording medium.

Effects of the Invention

According to the above construction, the transcoding of each coded piece and the writing of a transcoding result of each coded piece can be executed in a pipeline. Hence the writing of transcoding results can be completed more speedily.

While the auxiliary device is executing transcoding, the recording device can obtain its own transcoding results on the target recording medium. Since the recording device writes its own transcoding results during when the auxiliary device is executing transcoding, the auxiliary device can write its own transcoding results onto the target medium as soon as the writing of the transcoding results by the recording device ends. This enables the writing of the transcoding results by the auxiliary device to be performed at an earlier stage, so that the transcoding results by both devices can be obtained on one target medium more speedily. In this way, an operation of copying between media, which involves transcoding, is accelerated.

Here, the recording device may further include: an allocation unit operable to allocate coded pieces which form a former part of the digital stream to the recording device, and coded pieces which form a latter part of the digital stream to the auxiliary device; and a transmission unit operable to transmit, to the auxiliary device, the coded pieces which form the latter part of the digital stream in sequence from a last coded piece, wherein the transcoding unit transcodes the coded pieces which form the former part of the digital stream, in sequence from a top coded piece, and the auxiliary device transcodes the transmitted coded pieces one by one. Since the coded pieces of the digital stream are sequentially transmitted from the last coded piece, when modifying the sharing of loads between the recording device and the auxiliary device, the boundary between the former part and the latter part of the digital stream can be changed easily.

Here, the allocation unit in the recording device may set a transcoding target for the recording device and a transcoding target for the auxiliary device, and notify the auxiliary device of the transcoding target for the auxiliary device, wherein the recording device further includes: a judgment unit operable to judge, when the recording device has reached the transcoding target for the recording device, whether the auxiliary device has reached the transcoding target for the auxiliary device, and the transcoding unit transcodes a coded piece that follows the transcoding target for the recording device, if the auxiliary device has not reached the transcoding target for the auxiliary device.

Even when the processing efficiency of the auxiliary device is low, the processing allocation can be made flexibly. Hence the effects of the present invention can be achieved despite the difference in performance between the main device and the auxiliary device. Thus, it is possible to improve the transcoding efficiency even for a hybrid system that is constituted by a variety of devices.

BRIEF DESCRIPTION OF THE DRAWINGS

FIG. 4 shows an example of a GUI controlled by a GUI control unit 9.

Figure 1:
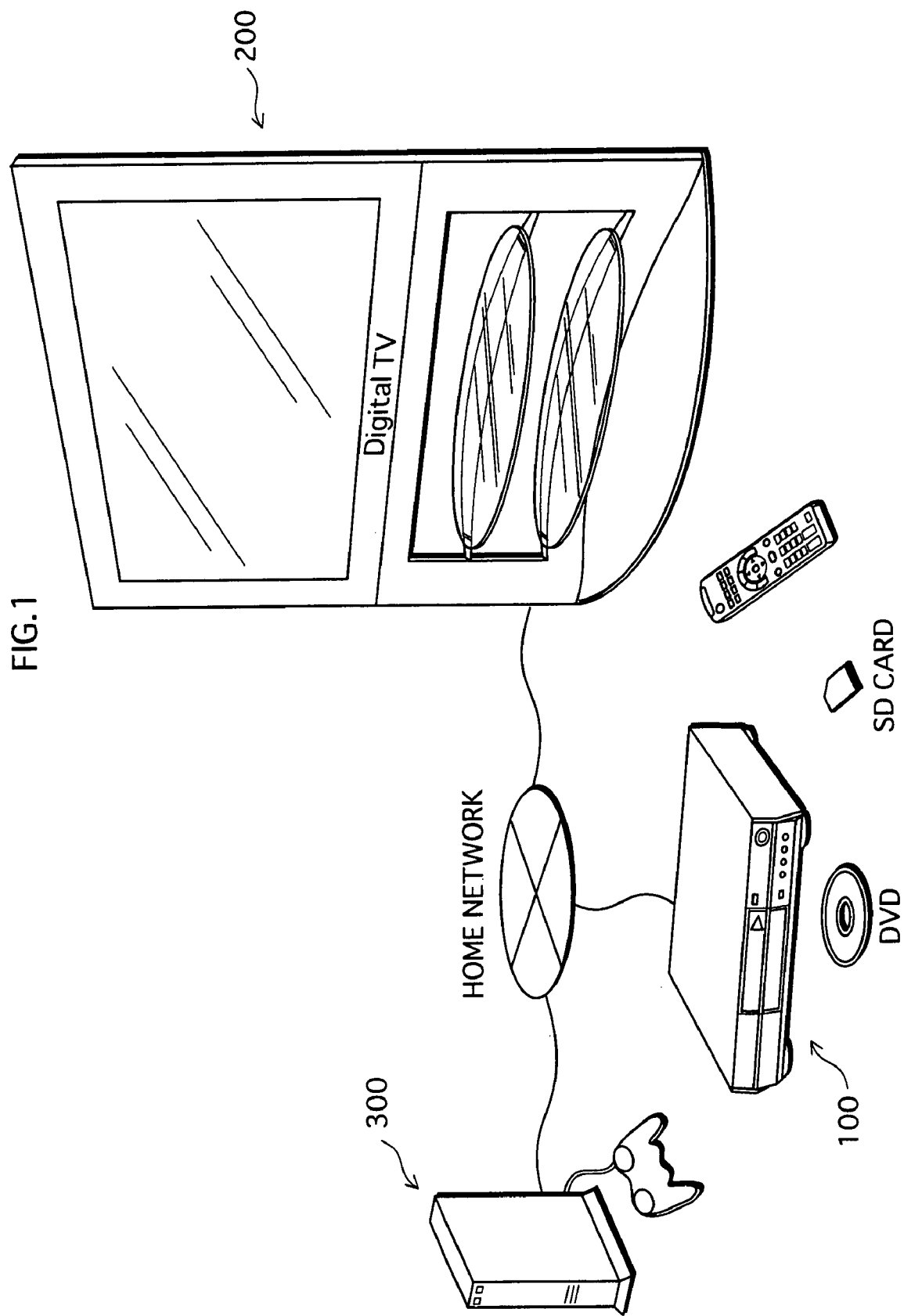
FIG. 1 shows a home server system that is a use environment of a system according to the present invention.

| Description of Reference Numerals | |
|---|---|
| 1 | tuner |
| 2 | source medium |
| 3 | target medium |
| 4 | transcoder |
| 5 | transmission/reception unit |
| 6 | buffer |
| 7 | buffer |
| 8 | microcomputer system |
| 9 | GUI control unit |
| 10 | transcoding control unit |
| 11 | auxiliary device detection unit |
| 12 | transmission/reception control unit |
| 13 | distributed processing allocation unit |
| 15 | digital electric appliance original hardware |
| 16 | transmission/reception unit |
| 17 | microcomputer system |
| 18 | EEPROM |
| 19 | plug-in |
| 20 | software transcoder |
| 21 | timer reservation setting unit |
| 22 | transcoding control unit |
| 100 | hybrid recorder |
| 200 | digital television |
| 300 | game machine |

BEST MODE FOR CARRYING OUT THE INVENTION

The following describes an embodiment of a system according to the present invention.

Firstly, a form of use out of the forms of an act of working of the system according to the present invention is described below. The system according to the present invention is a home server system that is constituted by a recording device and a digital television, and is submitted for use in recording a digital stream which is broadcast by digital television broadcasting. FIG. 1 shows the home server system according to the present invention.

The home server system is formed by connecting digital electric appliances each equipped with an IEEE 1394 digital interface, such as a hybrid recorder 100 which is a recording device, a digital television 200, and a game machine 300, with a network.

Each device connected with the network can output an MPEG2-TS (Transport Stream) digital stream received from a broadcast station to another device via IEEE 1394, and acquire a digital stream, which another device has received from a broadcast station, via IEEE 1394. A digital stream can be freely copied within a closed world that is the home server system. An exemplary form of use of the system according to the present invention is as described above.

To transfer an MPEG2-TS digital stream to another device on the network, the recording device uses a DTCP (Digital Transmission Content Protection) protocol. This DTCP protocol includes procedures such as mutual device authentication and TS packet encryption/decryption. Since the DTCP protocol is not a main feature of the present invention, its detailed explanation has been omitted here. A device that performs transmission/reception of TS packets according to DTCP rejects, at a mutual authentication stage, connection with a device which does not comply with copyright protection. This prevents a digital stream from being transferred to a drive device, such as Microdrive or CompactFlash, that has no copyright protection mechanism.

Note here that information as to whether or not a digital stream can be written to a DVD, an HD, and the like is shown in a DTCP-Descriptor prescribed by DTCP, and notified to another device.

Each device in the home server system is described below.

The hybrid recorder 100 is a device that receives a digital stream broadcast by digital television broadcasting, and writes the received digital stream onto an HD. The hybrid recorder 100 can play back the digital stream written on the HD. Also, the hybrid recorder 100 can copy the digital stream written on the HD to an SD card or a DVD.

The digital television 200 displays a playback output of the hybrid recorder 100.

The game machine 300 executes a game application recorded on a BD-ROM, a DVD-ROM, and the like.

The digital stream broadcast by digital television broadcasting is an MPEG2-TS multiplexed stream generated by multiplexing a video stream and an audio stream. Each video frame in the video stream has a time length of about 33 msec (more precisely 1/29.97 sec), and constitutes picture data for displaying one screen of image. The picture data has types such as a Bidirectionally Predictive (B) picture that is interframe compression-coded relative to past and future reference pictures, a Predictive (P) picture that is interframe compression-coded relative to past reference pictures, and an Intra (I) picture that is intraframe compression-coded using spatial frequency characteristics within one frame without relative to other pictures. An I picture occurs approximately every 0.5 to 1.0 second. Hence the aforementioned interframe compression coding is conducted at intervals of about 0.5 to 1.0 second. One part of the digital stream that has undergone the interframe compression coding is called a "coded piece". The digital stream is decoded with this coded piece as a minimum unit. In detail, the coded piece is made up of a GOP (Group of Pictures) defined by MPEG2 and an audio frame-read simultaneously with this GOP. With the provision of this coded piece, the above copying and playback by the hybrid recorder 100 can be performed using the coded piece as a minimum unit.

Figure 2:
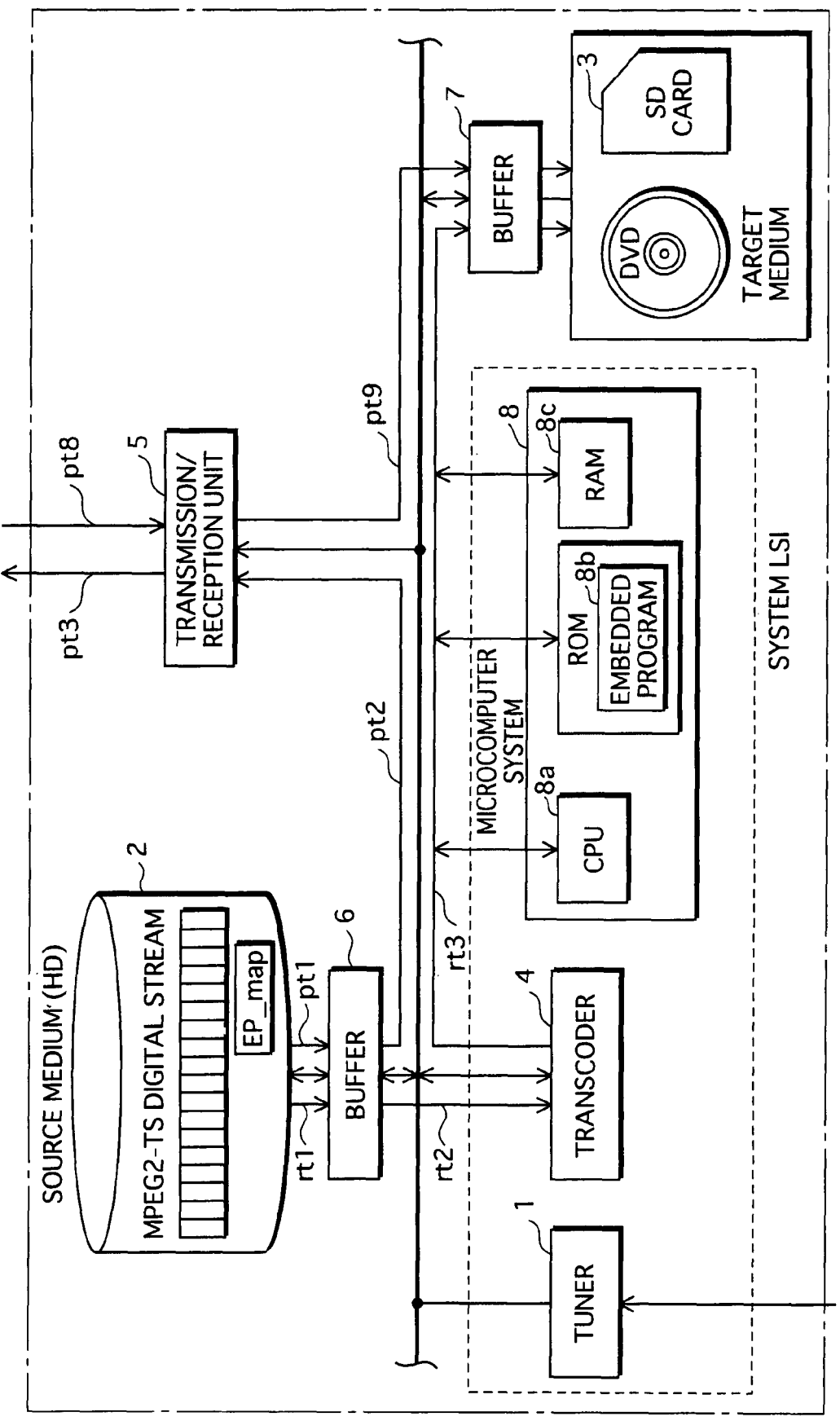
FIG. 2 shows an internal structure of a recording device.

An exemplary form of use of each device according to the present invention is as described above. An exemplary form of production of the hybrid recorder that is the recording device is described next. The hybrid recorder 100 is roughly composed of parts that are an integrated circuit, a drive device, and a power supply circuit. The hybrid recorder 100 can be manufactured by mounting these parts on a cabinet and a substrate of the device. The integrated circuit is a circuit including various processing units for achieving the functions of the hybrid recorder 100. The recording device manufactured in this way has an internal structure shown in FIG. 2. As shown in FIG. 2, the recording device includes a tuner 1, a source medium 2, a target medium 3, a transcoder 4, a transmission/reception unit 5, a buffer 6, a buffer 7, and a microcomputer system 8. Of these construction elements, the tuner 1, the transcoder 4, and the microcomputer system 8 are incorporated in the hybrid recorder 100 as one system LSI.

The tuner 1 receives a broadcast wave and obtains an MPEG2-TS digital stream.

The source medium 2 stores a digital stream. The digital stream referred to here is an MPEG2-TS digital stream obtained by multiplexing a video stream and an audio stream. Since access to the digital stream needs to be performed based on coded pieces, the digital stream stored on the source medium 2 is associated with an EP-map (EntryPoint-Map). In a digital stream, a coded piece corresponds to a GOP (Group of Pictures) in a video stream and an audio frame read simultaneously with this GOP. To enable playback to be performed from the beginning of each GOP in the digital stream, the EP-map shows a playback start time of an I picture located at the beginning of each GOP and an address of the I picture at the beginning of each GOP, in correspondence with each other. The playback start time of the I picture is expressed by a time stamp (Presentation Time Stamp) of the I picture. The address of the I picture, meanwhile, is expressed by a TS packet serial number (SPN (Source Packet Number)). By using this EP-map, it is possible to perform time to address conversion. Which is to say, an arbitrary playback point on a playback time axis of the digital stream can be converted to an address of a coded piece. Accordingly, access to an arbitrary coded piece in the digital stream can be made by using an arbitrary playback point on the playback time axis of the digital stream.

The target medium 3 is a portable recording medium such as a DVD or an SD card. A coding format used in the SD card is MPEG4-AVC, whereas a coding format used in the DVD is MPEG2-PS (Program Stream). These coding formats differ from the coding format used in the HD. Because of this difference in coding format, when copying a digital stream recorded on the HD to the target medium, it is necessary to perform a process (transcoding) of converting one coding format to another. Transcoding is a process of returning a digital stream, which is recorded on a recording medium by some kind of coding format, first to a decompressed form and then compressing the digital stream by another coding format. Transcoding requires real-time processing.

The transcoder 4 is an entity for executing transcoding, and converts the coding format of the digital stream to be recorded on the target medium 3. There are various types of coding formats that can be subjected to conversion by the transcoder 4. These coding formats include not only MPEG2-TS, MPEG2-PS, and MPEG4-AVC, but also VC-1 and the like.

For the simplicity's sake, the following description uses the example of the coding format for the DVD or the coding format for the SD card.

The transmission/reception unit 5 performs transmission/reception of coded pieces that constitute the digital stream. Through the transmission of coded pieces by the transmission/reception unit 5, the digital stream recorded on the target medium such as the target medium 3 can be output to and played back by the digital television connected to the network. Also, through the reception of coded pieces by the transmission/reception unit 5, coded pieces output from another device can be written to the target medium such as the target medium 3. Such transmission/reception makes it possible for the recording device to operate in conjunction with another device connected by the network.

Upon transmitting a coded piece included in the digital stream, the transmission/reception unit 5 performs mutual authentication with a device in communication, to judge whether the device complies with copyright protection. If the device complies with copyright protection, the transmission/reception unit 5 generates a session key unique to a session of distributed processing, and shares the session key with the device. Subsequently, the transmission/reception unit 5 encrypts a coded piece using this session key and transmits the encrypted coded piece to the device.

The buffer 6 is a buffer for smoothing out speed discrepancies between a rate of reading from the source medium 2 and a rate of transcoding by the transcoder 4.

The buffer 7 is a buffer for smoothing out speed discrepancies between a rate of writing to the target medium 3 and the rate of transcoding by the transcoder 4.

The microcomputer system 8 is a typical computer system composed of a CPU, a RAM, and a ROM storing a program. As a result of the program stored on the ROM being read out to the CPU and operating in conjunction with hardware resources, operations or processing of information for intended use can be achieved. The intended use referred to here includes copying, interactive operations, and the like. As a result that specific means cooperatively realized by the program and the hardware resources performs processing or operations of information for the intended use, a specific information processing device (the hybrid recorder 100) corresponding to the intended use is implemented.

Figure 3:
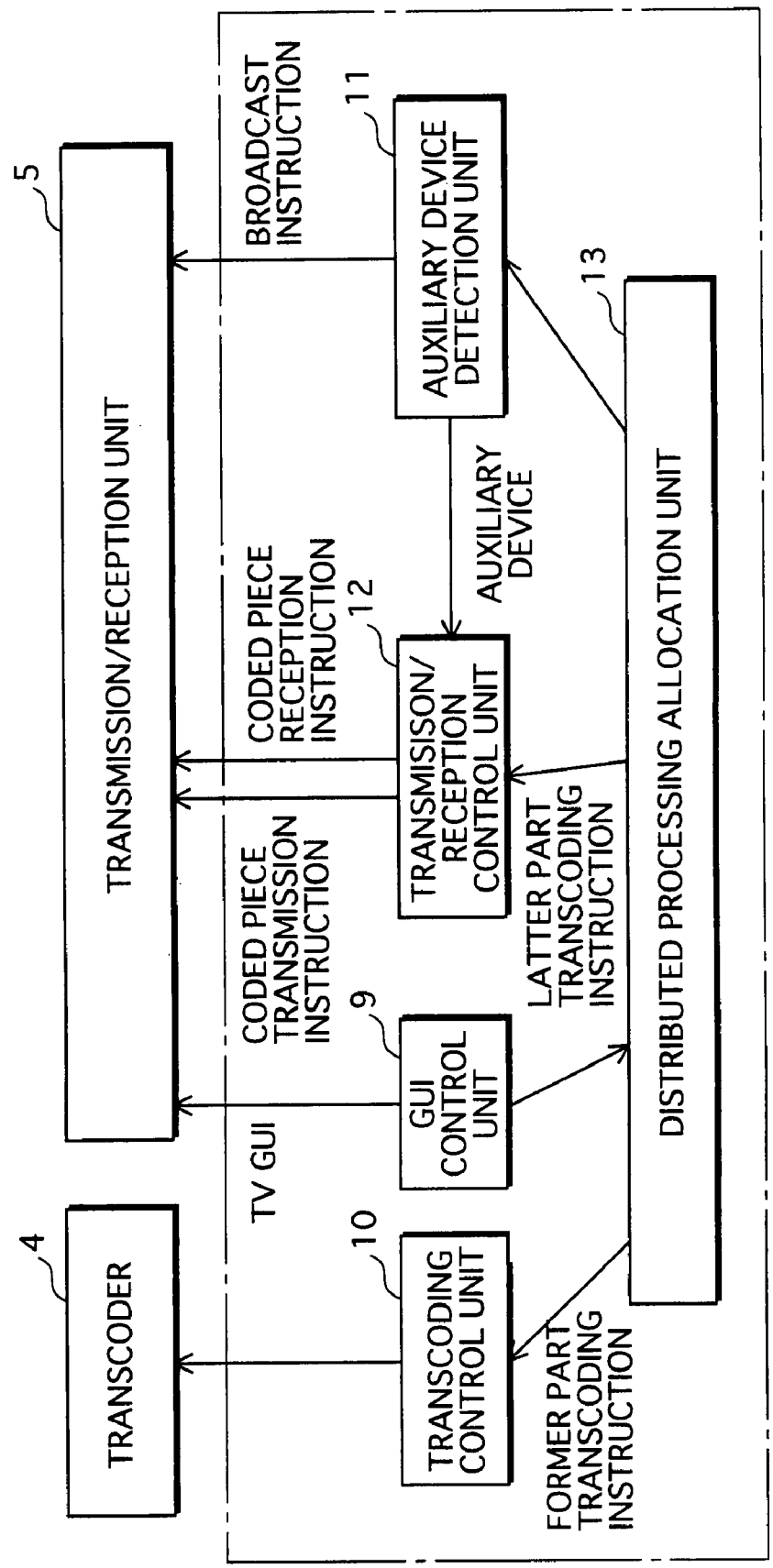
FIG. 3 shows a functional structure of specific means cooperatively realized by a hardware resource and a program constituting a microcomputer system 8.

FIG. 3 shows a functional structure of the specific means cooperatively realized by the hardware resources and the program constituting the microcomputer system 8. The microcomputer system 8 is functionally composed of a GUI control unit 9, a transcoding control unit 10, an auxiliary device detection unit 11, a transmission/reception control unit 12, and a distributed processing allocation unit 13.

The GUI control unit 9 generates a GUI, and instructs the transmission/reception unit 5 to have the digital television 200 display the GUI. The GUI control unit 9 also exercises integrated control of the recording device, according to user operations. The GUI is a graphics representation of each target medium and a plurality of digital streams recorded on the HD. FIG. 4 shows an example GUI controlled by the GUI control unit 9. In FIG. 4, a GUI component having a character string "CONTENT 1 2002 11/3 CH3 PM8:00-PM8:45 STANDARD IMAGE QUALITY" shows a digital stream recorded on the HD. Also, buttons bn1 and bn2 show the target media (the DVD, the SD card) that can be copy destinations of digital streams. A GUI component showing a digital stream has three states that are normal, focus, and active. The normal state indicates that the digital stream is not selected by the user. The focus state indicates that the digital stream is, designated as a candidate for a copy target using an arrow key on a remote control. The active state indicates that the digital stream is determined as the copy target. By performing an operation on the GUI shown in FIG. 4, one of content 1 to content 5 recorded on the HD can be selected as the copy target. The GUI control unit 9 instructs the transcoding control unit 10 and the distributed processing allocation unit 13 to copy the digital stream which is in the active state in this GUI.

The transcoding control unit 10, when instructed to copy the digital stream, exercises control to copy the digital stream in the recording device. Arrows rt1, rt2, and rt3 in FIG. 2 indicate a flow of a coded piece in the case where transcoding is performed in the recording device. As indicated by these arrows, the coded piece reaches the target medium through the route of the source medium 2→the buffer 6→the transcoder 4→the buffer 7. When an arbitrary coded piece in the digital stream is denoted by $F(x)$, the control by the transcoding control unit 10 is composed of (i) a process of transcoding $F(x)$ and (ii) a process of writing a transcoding result $T(F(x))$ to the target medium. This control by the transcoding control unit 10 has a property that the transcoding of $F(x+1)$ is performed at the same time as the writing of $T(F(x))$ to the target medium. This means that a plurality of coded pieces are processed in a pipeline.

Figure 5:
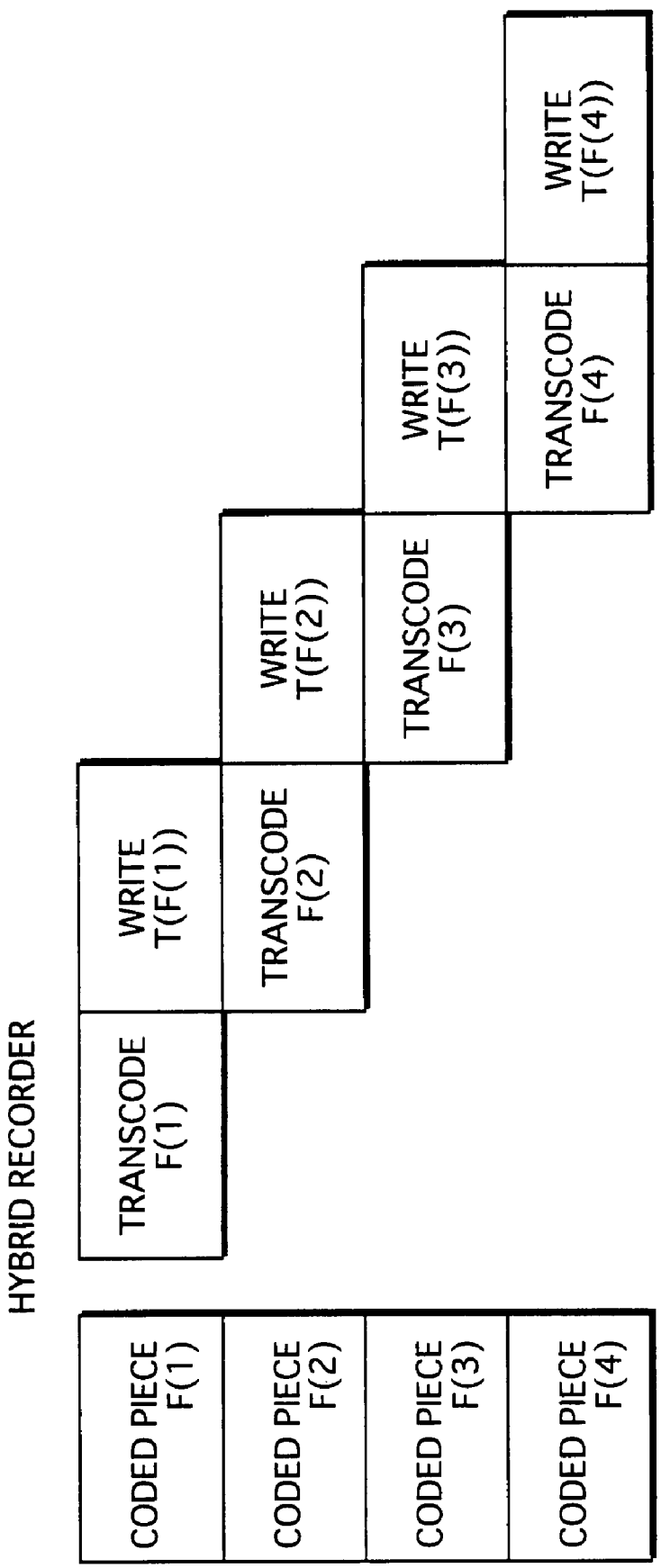
FIG. 5 shows transcoding by a transcoding control unit 10 when x=1, 2, 3, 4.

FIG. 5 shows the transcoding by the transcoding control unit 10 when x=1, 2, 3, 4. FIG. 5 illustrates the transcoding of $F(1)$ and the writing of $T(F(1))$, the transcoding of $F(2)$ and the writing of $T(F(2))$, the transcoding of $F(3)$ and the writing of $T(F(3))$, and the transcoding of $F(4)$ and the writing of $T(F(4))$.

When viewing FIG. 5 in a vertical direction, it can be understood that the writing of $T(F(1))$ and the transcoding of $F(2)$ are executed simultaneously. Likewise, the writing of $T(F(2))$ and the transcoding of $F(3)$ are executed simultaneously, and the writing of $T(F(3))$ and the transcoding of $F(4)$ are executed simultaneously. Since the writing of $T(F(X))$ and the transcoding of $F(X+1)$ are executed simultaneously, a time taken for copying between media is "(a time required for transcoding a plurality of coded pieces)+(a time required for writing a transcoding result of a last coded piece)". As a result of this pipeline control by the transcoding control unit 10, the transcoding results are obtained on the target medium at an earlier stage. This completes the description of the transcoding control unit 10.

The auxiliary device detection unit 11 detects, when the recording device launches some kind of process, which digital electric appliance is available for distributed processing of that process. This detection is made by broadcasting to each digital electric appliance on the network and receiving a response from each digital electric appliance. The response indicates whether the digital electric appliance is capable of aiding in distributed processing. The recording device recognizes a device which indicates to be capable of distributed processing, as a device (auxiliary device) that can aid the recording device. The detection by the auxiliary device detection unit 11 is performed periodically, such as every 5 minutes or every 10 minutes. Which digital electric appliance serves as an auxiliary device is updated each time the auxiliary device detection unit 11 performs the detection. Though the inquiry about which device is capable of distributed processing is made by broadcasting in this embodiment, instead each digital electric appliance may submit a voluntary notification.

The transmission/reception control unit 12, when instructed to copy the digital stream, receives information about the most recently detected auxiliary device from the auxiliary device detection unit 11, and exercises control to have the auxiliary device transcode the digital stream. This control is composed of a process of transmitting $F(j)$ to the auxiliary device and a process of receiving $T(F(j))$ from the auxiliary device and writing it to the target medium. Arrows pt1, pt2, pt3, pt8, and pt9 in FIG. 2 indicate a flow of a coded piece in the case where transcoding is performed under control of the transmission/reception control unit 12. From these arrows, it can be understood that the coded piece on the source medium 2 reaches the target medium 3 through the route of the buffer 6 →the transmission/reception unit 5→the auxiliary device →the transmission/reception unit 5→the buffer 7. The transmission to the auxiliary device has two types that are batch transmission and handshake transmission. The batch transmission is to transmit coded pieces that constitute a latter part of the digital stream, to the auxiliary device at once. The handshake transmission is to transmit, only after being notified of the completion of transcoding a transmitted coded piece, a next coded piece.

The distributed processing allocation unit 13 performs allocation to the recording device and the auxiliary device. In principle, the distributed processing allocation unit 13 divides the digital stream into a former half and a latter half and allocates the former half and the latter half respectively to the recording device and the auxiliary device. Having allocated in this way, the distributed processing allocation unit 13 instructs the transcoding control unit 10 to transcode the former half, and the transmission/reception control unit 12 to transcode the latter half. In the case where the transmission by the transmission/reception control unit 12 is handshake transmission, the distributed processing allocation unit 13 modifies the allocation in accordance with the progress of transcoding by the auxiliary device. Suppose, although the former half and the latter half of the digital stream have been allocated respectively to the recording device and the auxiliary device, the progress of transcoding by the auxiliary device is slow and only one half of the scheduled part (¼ of the total digital stream) has been transcoded by the auxiliary device. In such a case, the distributed processing allocation unit 13 modifies the allocation, by allocating the former ¾ of the digital stream to the recording device and the latter ¼ of the digital stream to the auxiliary device. In this way, the burden on the auxiliary device can be alleviated. Since the need for such an allocation modification may arise, in the case of handshake transmission, the distributed processing allocation unit 13 transmits the coded pieces of the latter half of the digital stream in sequence from the last coded piece. By transmitting from the last coded piece, the boundary between the former part and the latter part can be changed easily.

Figure 6:
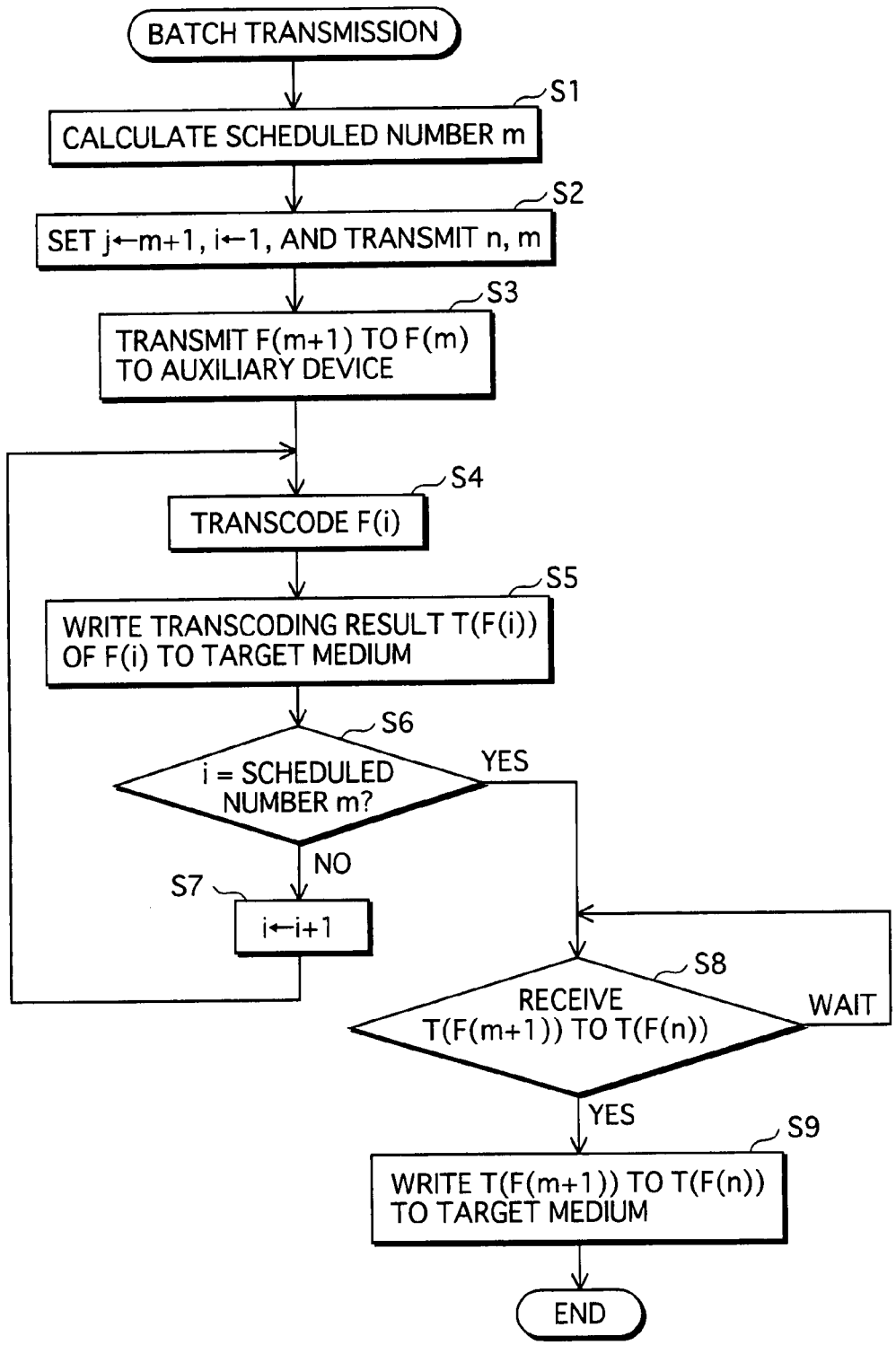
FIG. 6 is a flowchart showing an operation procedure of a main device in batch transmission.
Figure 7:
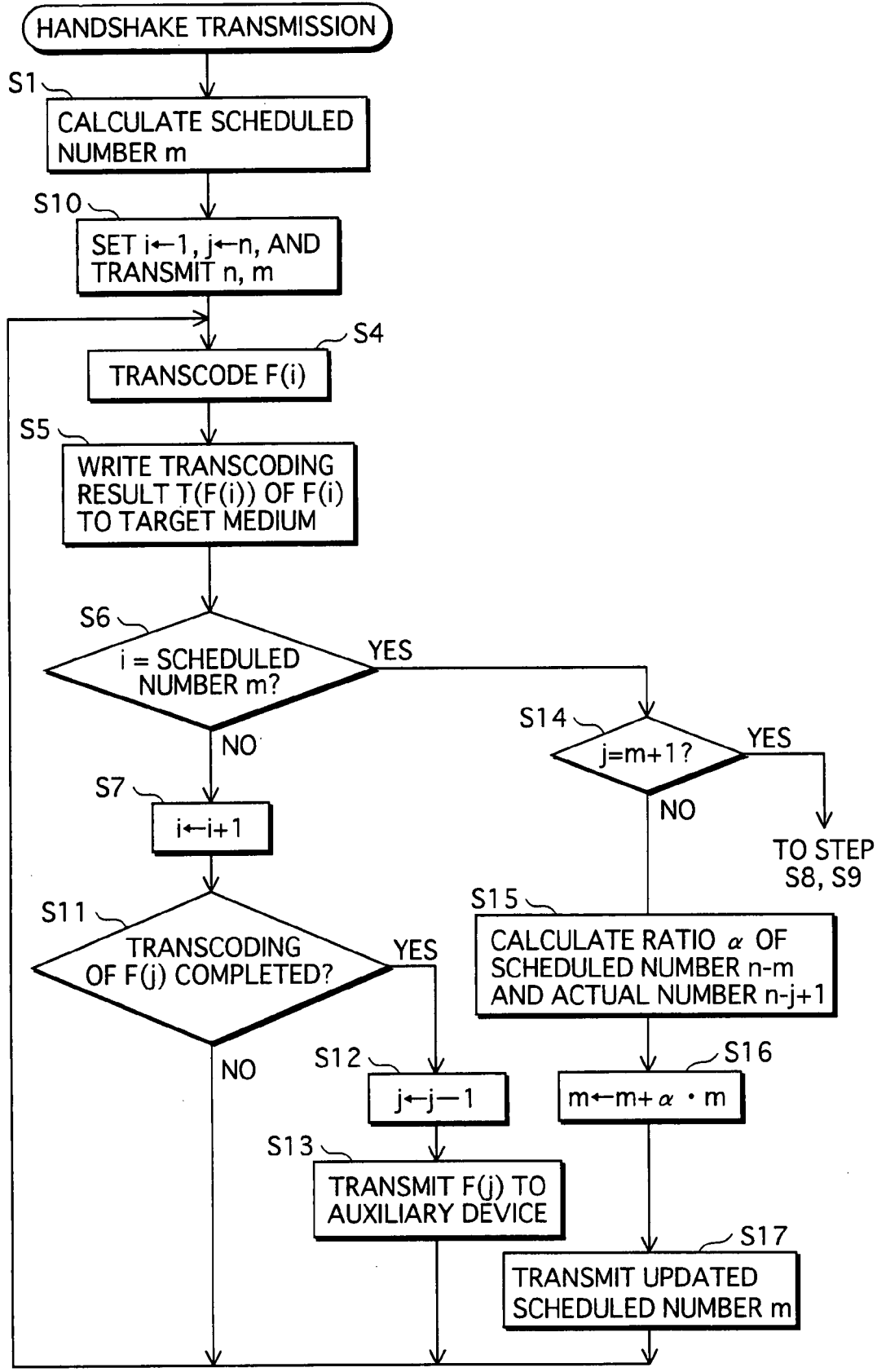
FIG. 7 is a flowchart showing an operation procedure of the main device in handshake transmission.

The GUI control unit 9 to the distributed processing allocation unit 13 can be realized by describing an operation procedure of each of the flowcharts of FIGS. 6 and 7 in a computer description language and having a computer execute the procedure. FIGS. 6 and 7 are the flowcharts showing this operation procedure. In these flowcharts, value n denotes a total number of coded pieces constituting the digital stream, whilst value m denotes a scheduled number of coded pieces to be transcoded by the recording device. Which is to say, of the n coded pieces, coded pieces 1 to m are to be processed by the recording device and coded pieces m+1 to n are to be processed by the auxiliary device. Variable i specifies a coded piece to be currently transcoded by the recording device among the coded pieces allocated to the recording device, whilst variable j specifies a coded piece to be currently transcoded by the auxiliary device among the coded pieces allocated to the auxiliary device.

FIG. 6 shows the flowchart in the case of batch transmission. In this flowchart, the recording device calculates scheduled number m (step S1), sets variable i to 1, variable j to m+1, and transmits n and m to the auxiliary device (step S2). The recording device then transmits coded pieces F(m+1) to F(n) to the auxiliary device (step S3). After this, the recording device executes a loop of steps S4 to S7. This loop is performed by transcoding coded piece F(i) (step S4), writing transcoding result T(F(i)) to the target medium (step S5), judging whether variable i reaches the scheduled number (step S6), and incrementing variable i if step S6 results in NO (step S7). If variable i reaches the scheduled number, the recording device waits for receiving T(F(m+1)) to T(F (n)) (step S8), and, upon reception, writes T(F(m+1)) to T(F(n)) to the target medium (step S9).

FIG. 7 is the flowchart in the case of handshake transmission. In this flowchart, the recording device calculates number m (step S1), sets variable i to 1, variable j to n, and transmits n and m to the auxiliary device (step S10). After this, the recording device repeatedly executes steps S4 to S7 and steps S11 to S14.

This loop is performed by transcoding coded piece F(i) (step S4), writing transcoding result T(F(i)) of coded piece F(i) to the target medium (step S5), and incrementing variable (step S7). The loop ends if both steps S6 and S14 result in YES.

Step S11 is a judgment as to whether the transcoding of coded piece F(j) by the auxiliary device is completed. Only if the transcoding is completed, the recording device decrements variable j (step S12) and transmits coded piece F(j) to the auxiliary device (step S13). The recording device does not decrement variable j unless it receives the response indicating the completion of the transcoding of coded piece F(j). Accordingly, when the progress of transcoding by the auxiliary device is slow, the recording device refrains from transmitting a next coded piece.

Step S14 is a judgment as to whether variable j reaches m+1. Step S14 is performed when variable i reaches scheduled number m (step S6: YES). When variable i reaches m (step S6: YES) and variable j reaches m+1 (step S14: YES), the recording device performs steps S8 and S9 shown in FIG. 6, before ending the loop.

When variable i reaches m (step S6: YES) but variable j does not reach m+1 (step S14: NO), the recording device calculates ratio α between scheduled number n−m and actual number n−j+1 (step S15), and adds a value obtained by multiplying number m by ratio α, to m (step S16). As a result of updating number m in this way, the part allocated to the recording device increases, whereas the part allocated to the auxiliary device decreases. Thus, the amounts of allocation to the recording device and the auxiliary device can be dynamically modified. The recording device transmits updated number m to the auxiliary device (step S17), and repeats the loop.

Figure 8:
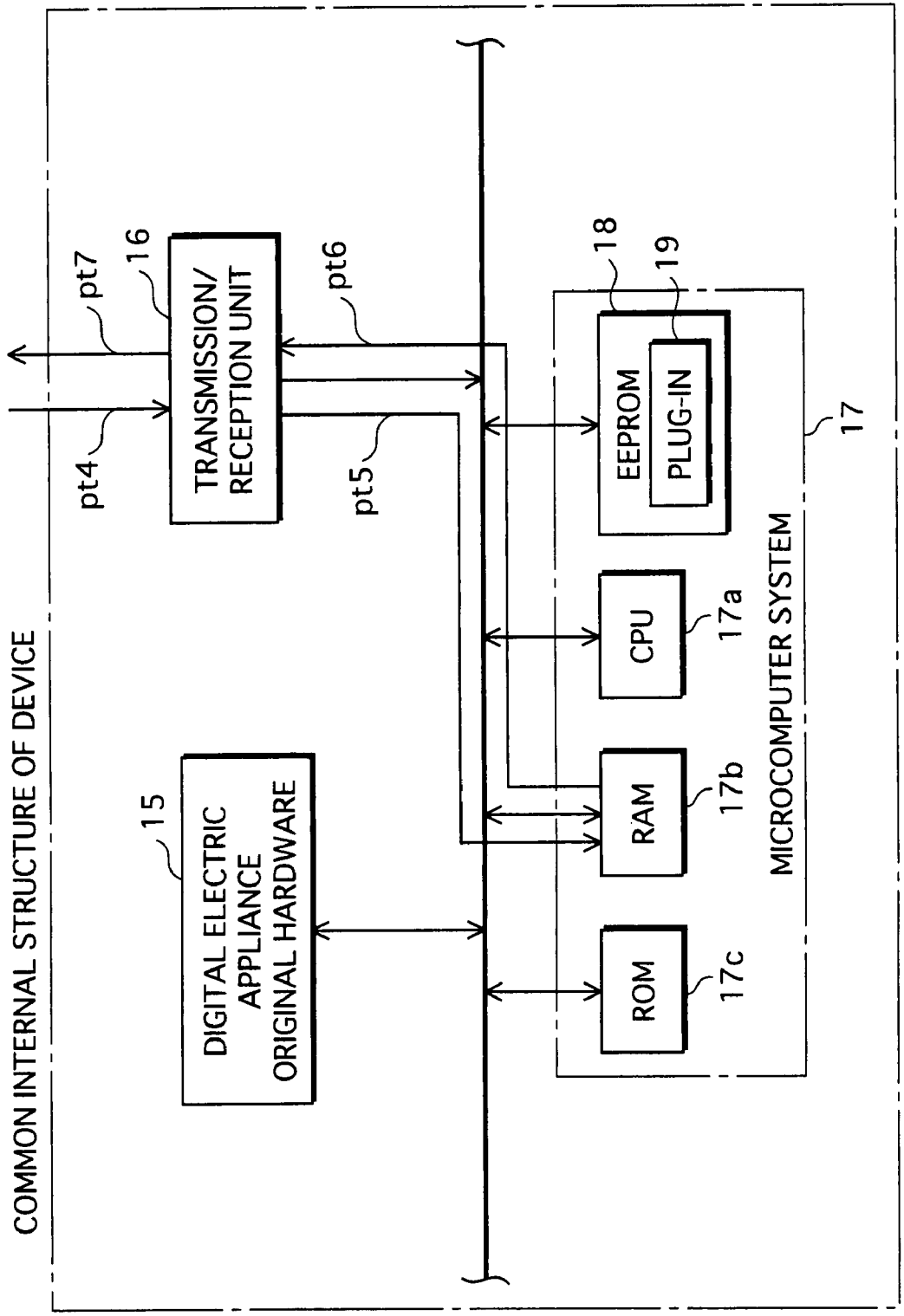
FIG. 8 shows a common structure of a digital electric appliance.
Figure 9:
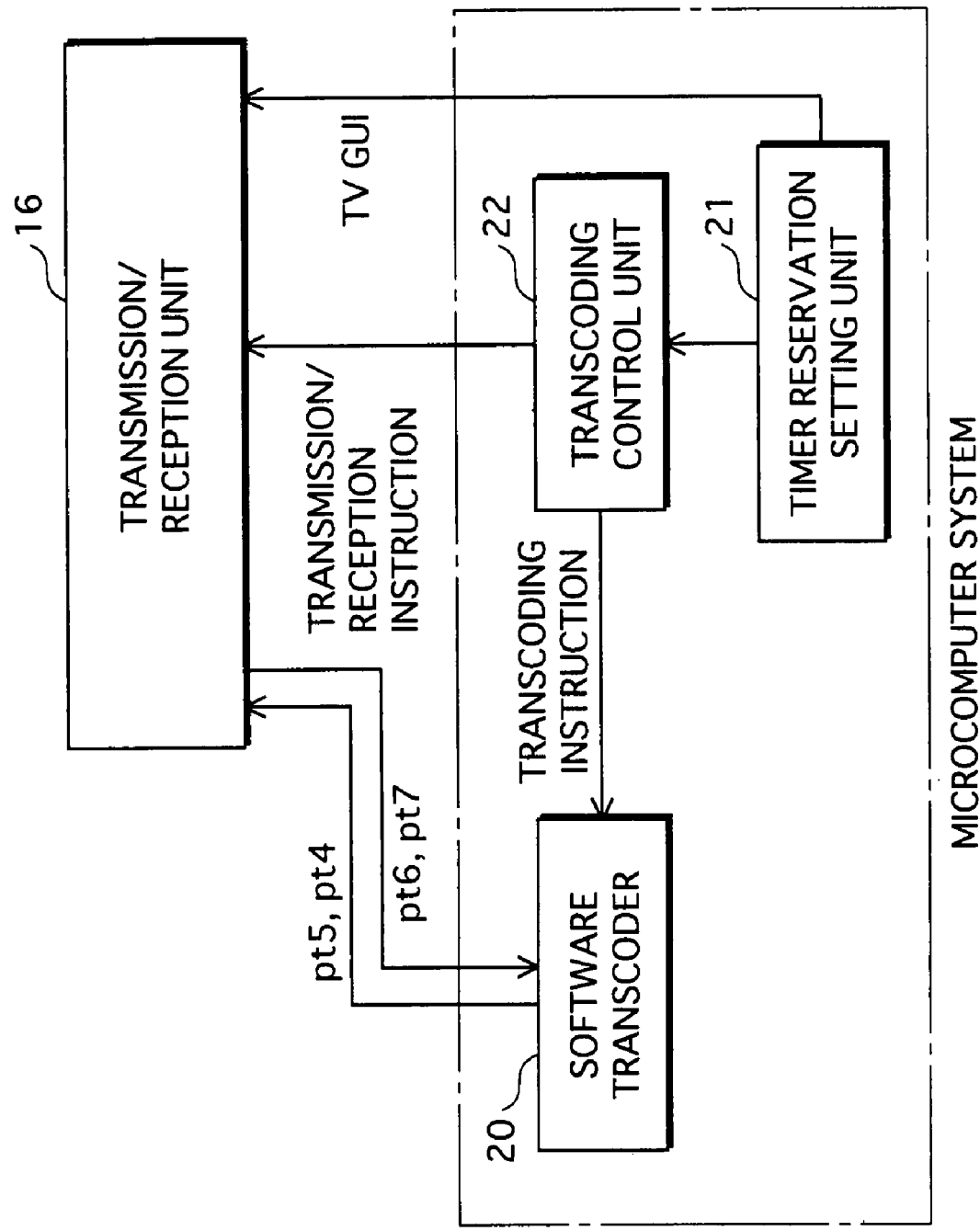
FIG. 9 shows a functional structure of specific means cooperatively realized by a hardware resource and a program constituting a microcomputer system 17.

The internal structure of the hybrid recorder 100 which is the recording device is as described above. The following describes an internal structure of the other digital electric appliances (the digital television 200, the game machine 300) that can each be the auxiliary device. The digital television 200 and the game machine 300 are each a network-connected digital electric appliance, and has a common internal structure shown in FIG. 8. As shown in FIG. 8, each digital electric appliance includes digital electric appliance original hardware 15, a transmission/reception unit 16, and a microcomputer system 17. The microcomputer system 17 includes a CPU 17a, a RAM 17b, a ROM 17c, and an EEPROM 18. The EEPROM 18 contains a plug-in 19 downloaded from a WEB site. As a result that a program stored on the ROM 17c or the EEPROM 18 is read out to the CPU 17a and operates in conjunction with the hardware resources, operations or processing of information for intended use can be realized. FIG. 9 shows specific means cooperatively realized by the hardware resources and the program in the microcomputer system 17.

As shown in FIG. 9, the microcomputer system 17 is functionally composed of a software transcoder 20, a timer reservation setting unit 21, and a transcoding control unit 22.

The software transcoder 20 is a transcoder realized by software.

The timer reservation setting unit 21 receives a timer reservation from the user. This timer reservation specifies a start time and an end time of a time period for transcoding.

Figure 10:
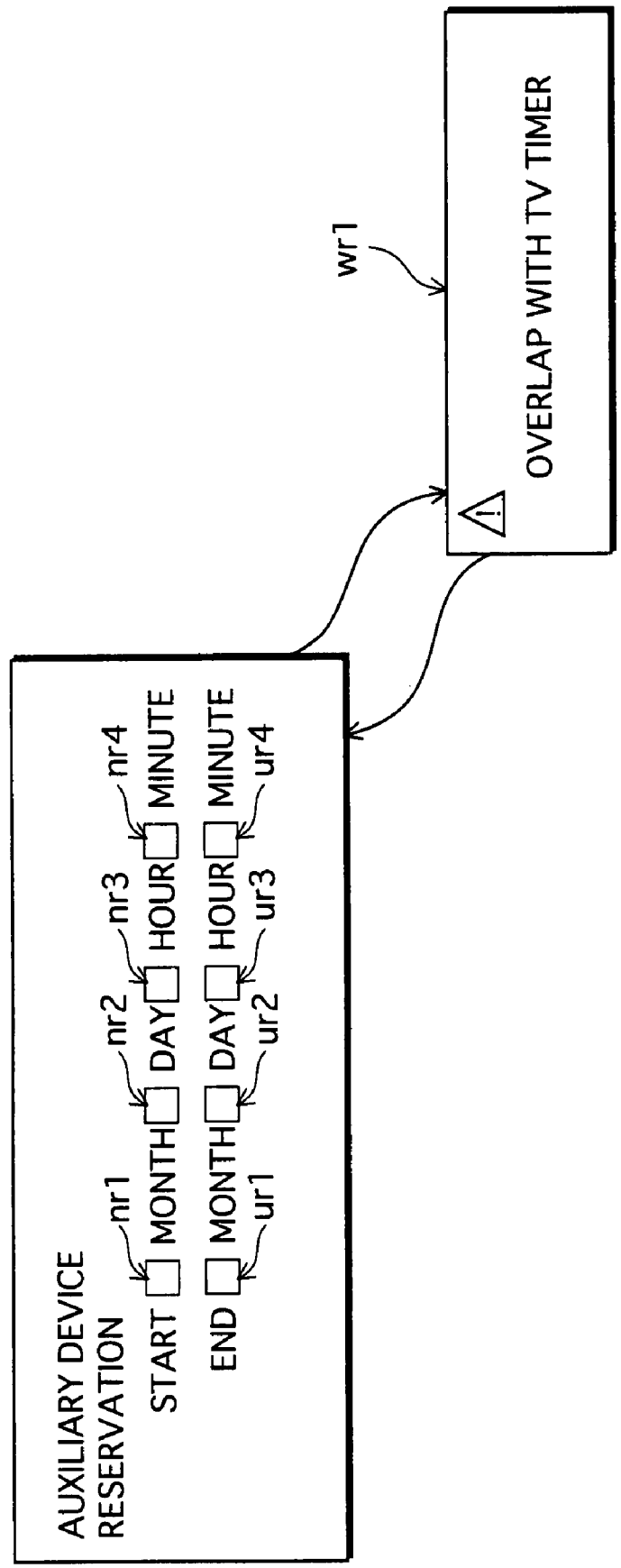
FIG. 10 shows an example of a reservation menu.

The reservation of the time period for executing transcoding is made on a menu shown in FIG. 10. FIG. 10 shows an example reservation menu. This reservation menu is made up of value fields nr1, nr2, nr3, and nr4 for specifying a date and time at which transcoding is to start in units of "month", "day", "hour", and "minute", and value fields ur1, ur2, ur3, and ur4 for specifying a date and time at which transcoding is to end in units of "month", "day", "hour", and "minute". By setting the reservation of the time period on this menu, the transcoding by the auxiliary device is carried out in this time period. Here, in the case where the auxiliary device is the digital television, the above time period may overlap with a time period that is timer-scheduled for displaying a program on time. In such a case, the timer reservation setting unit 21 displays a warning menu wr1, to notify the user that transcoding cannot be performed in the time period input by the user.

The transcoding control unit 22, upon receiving the transcoding request and the coded pieces to be transcoded from the recording device, stores the coded pieces sequentially received from the transmission/reception unit 16 onto the RAM, and has the software transcoder 20 transcodes the coded pieces. The transcoding control unit 22 controls the transmission/reception unit 16 to transmit obtained transcoding results to the recording device. Arrows pt4, pt5, pt6, and pt7 in FIG. 8 indicate a flow of a coded piece in the case where this transcoding is executed. A coded piece transmitted to the auxiliary device passes through the route in the recording device. A coded piece transmitted from the auxiliary device is input to the recording device, passes through the route in the recording device, and reaches the target medium. From the arrows, it can be understood that the coded piece is sent back to the recording device through the route of the transmission/reception unit 16→the software transcoder 20→the transmission/reception unit 16.

Figure 11:
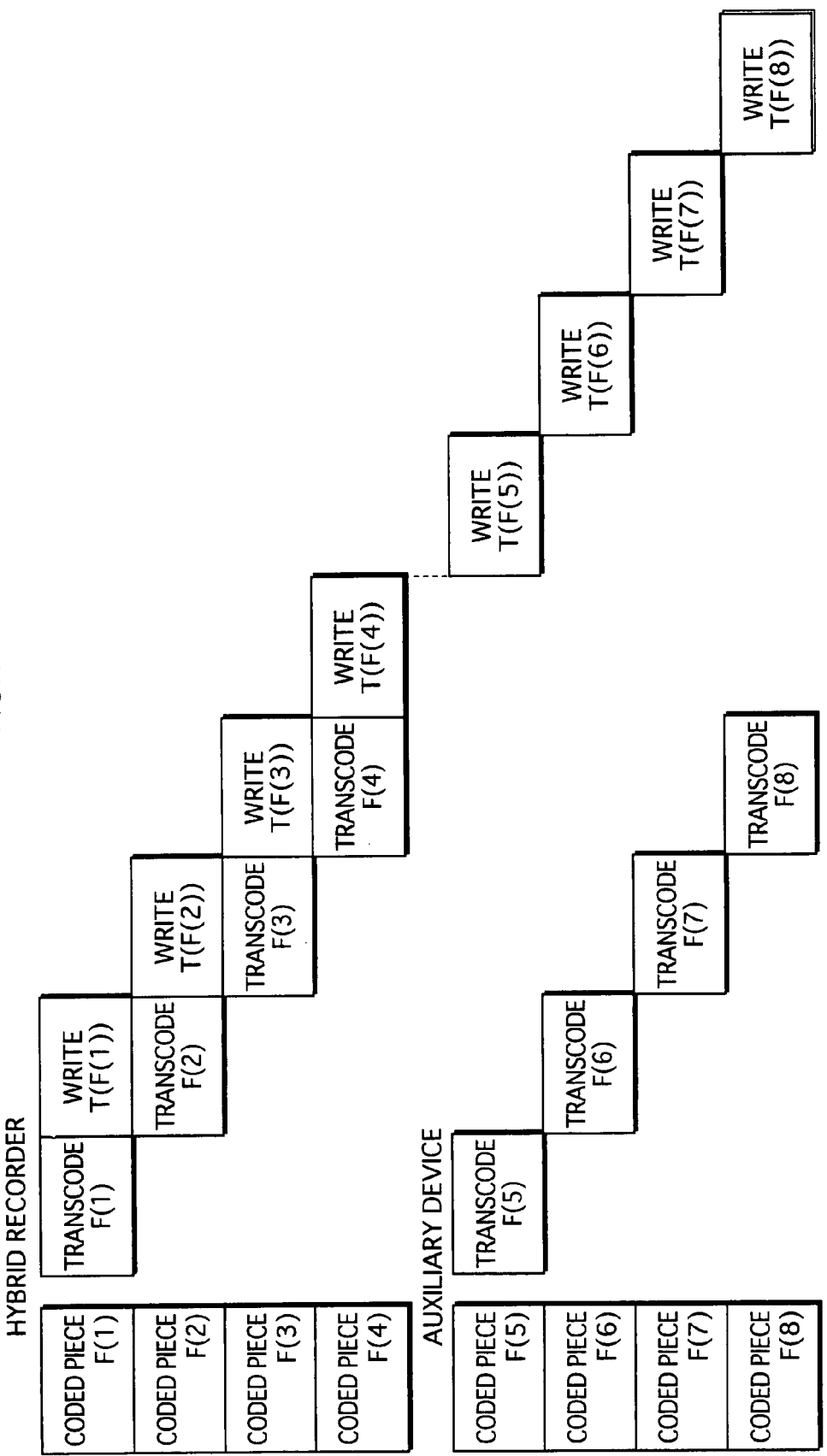
FIG. 11 is a timing chart when a plurality of coded pieces are transmitted in a batch.

The transcoding by the recording device is carried out by performing the transcoding of each coded piece and the writing of a transcoding result of each coded piece in a pipeline. On the other hand, the transcoding by the software transcoder 20 in the auxiliary device is carried out by transcoding the coded pieces of the latter part in sequence and, once the transcoding of all coded pieces is completed, transmitting transcoding results of the coded pieces to the recording device in sequence. FIG. 11 is a timing chart showing the transcoding by the recording device and the transcoding by the auxiliary device. The upper portion of FIG. 11 shows the transcoding and writing by the recording device, whereas the lower portion of FIG. 11 shows the transcoding and writing by the software transcoder 20 in the auxiliary device. The lower portion of FIG. 11 is based on an assumption that j=5, 6, 7, 8. In the lower portion of FIG. 11, while F(5) to F(8) are being transcoded, transcoding results of these coded pieces are temporarily held on the RAM. Only after the transcoding of the last coded piece T(F(8)) is completed, T(F(5)) to T(F(8)) are read from the memory and transmitted to the recording device so as to be written to the target medium.

Meanwhile, in the timing chart corresponding to the recording device in the upper portion of FIG. 11, while F(S) to F(8) are being transcoded, F(1) to F(4) are being transcoded. Since the recording device executes the transcoding and the writing in a pipeline, if T(F(5)) to T(F(8)) are transmitted to the recording device upon the completion of the transcoding of F(8), the recording device can write T(F(5)) to T(F(8)) to the target medium as soon as the writing of T(F(4)) ends.

The recording device executes the transcoding and the writing in a pipeline, while the auxiliary device operates not in a pipeline manner. Therefore, the transcoding results by the auxiliary device can be written to the target medium, with there being only a slight time lag (the time required to write T(F(4)) in this example). Since a copy of the digital stream can be obtained on the target medium with only a slight time delay, the processing time in the case where the copying of the digital stream is distributed between the recording device and the auxiliary device is about ½ of the playback time of the digital stream. When there are two devices capable of distributed processing, the time required for copying the digital stream can be reduced to about ½ of the playback time. Therefore, an operation of copying between media having different coding formats can be conducted at high speed.

Figure 12:
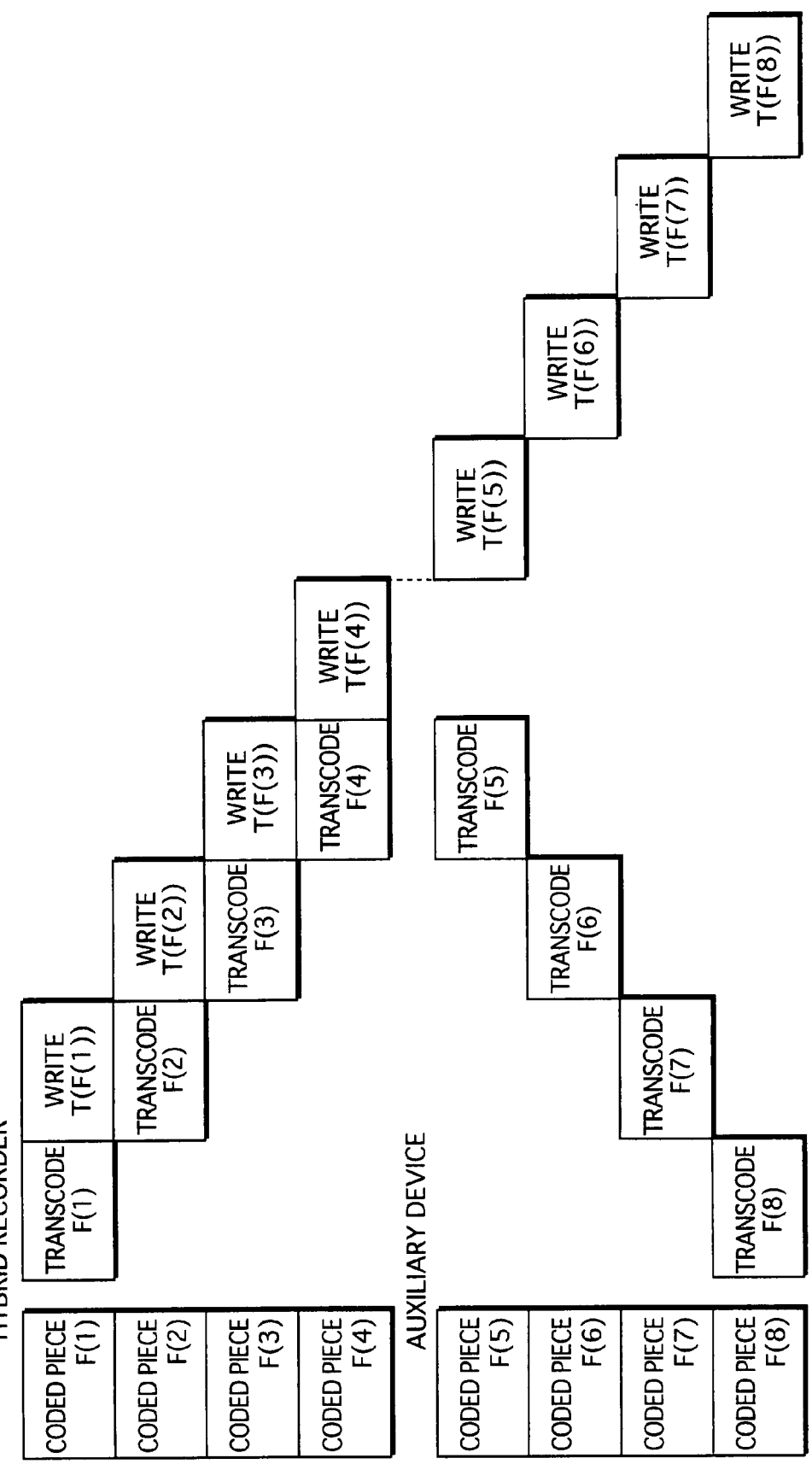
FIG. 12 is a timing chart when a plurality of coded pieces are transmitted in a handshake.
Figure 13:
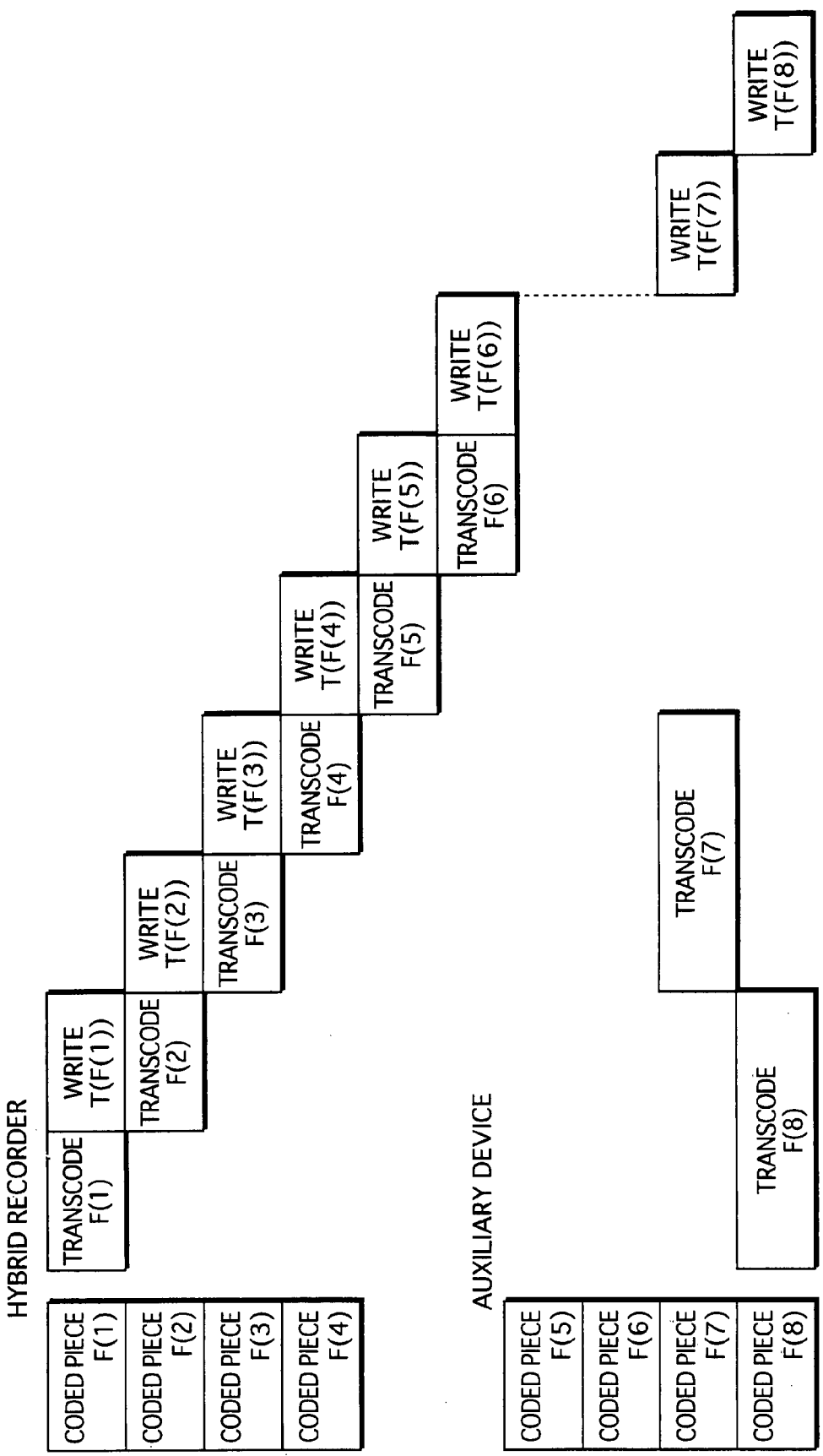
FIG. 13 is a timing chart when a scheduled number of coded pieces is changed from 4 to 2.

FIG. 11 is the timing chart when the plurality of coded pieces are transmitted in a batch. On the other hand, FIG. 12 is a timing chart when the plurality of coded pieces are transmitted in a handshake. In the case of handshake transmission, the coded pieces are transmitted to the auxiliary device in the order of F(8), F(7), F(6), and F(5), beginning with the last coded piece. FIG. 12 is the same as FIG. 11 in that each transmitted coded piece is transcoded one by one and, once the transcoding of all coded pieces has completed, all transcoding results are transmitted to the recording device at once. In the case of handshake transmission, however, there is a possibility of changing the allocation of coded pieces. FIG. 13 is a timing chart when the scheduled number of coded pieces is changed from 4 to 2.

Figure 14:
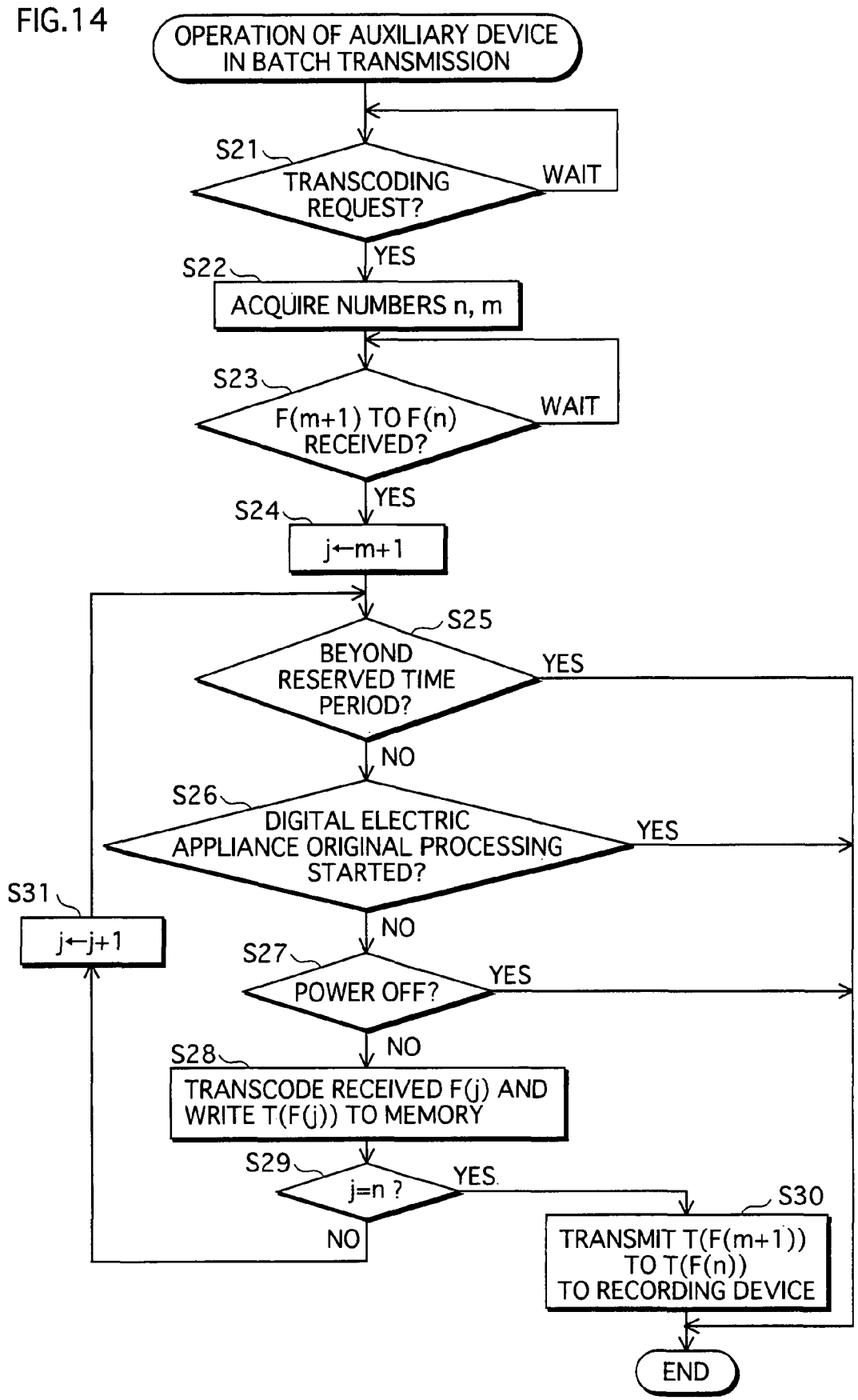
FIG. 14 is a flowchart showing an operation procedure of an auxiliary device in batch transmission.
Figure 15:
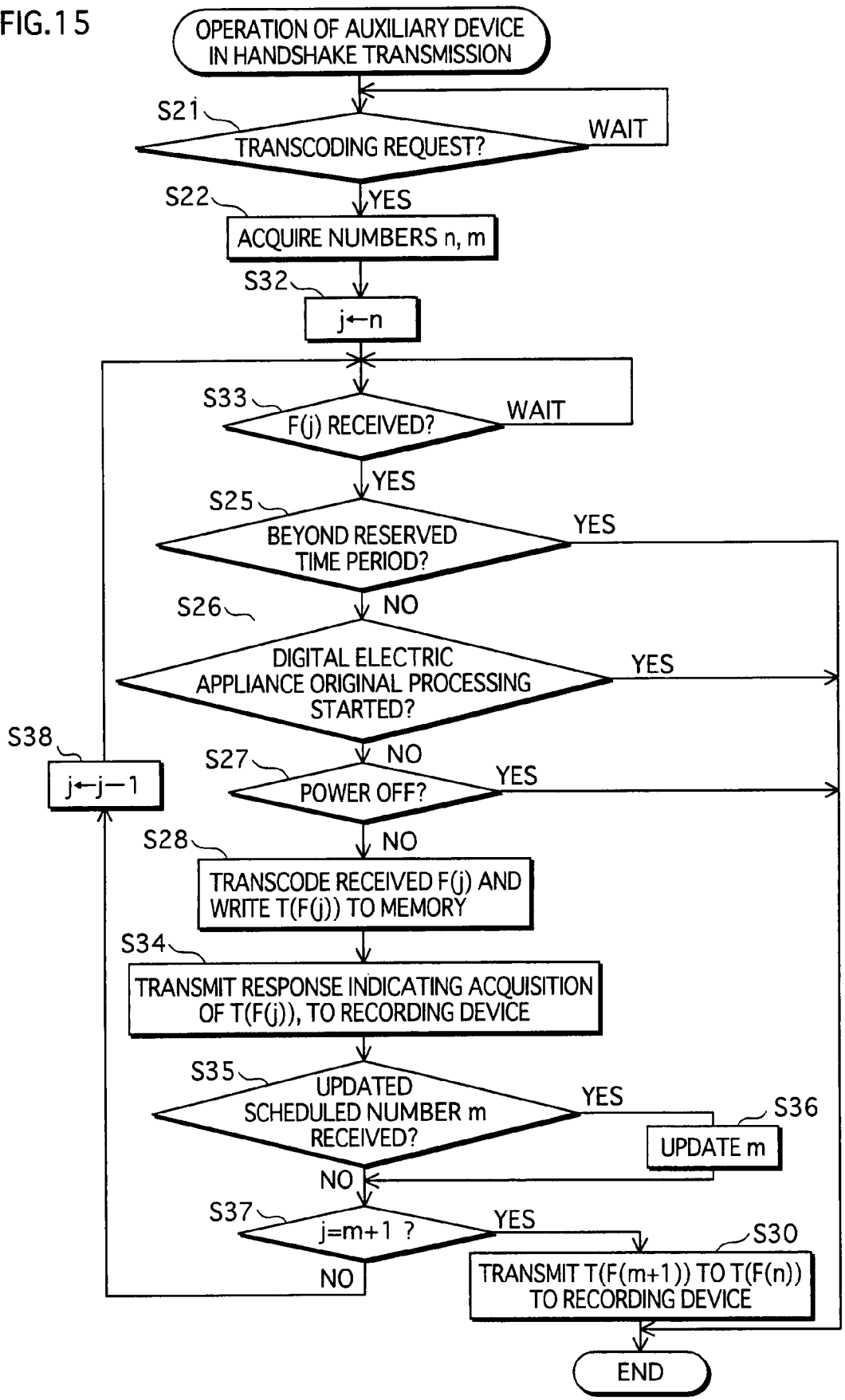
FIG. 15 is a flowchart showing an operation procedure of the auxiliary device in handshake transmission.

The above processing by the transcoding control unit 22 can be realized by the CPU executing a program shown in each of the flowcharts of FIGS. 14 and 15.

FIG. 14 is a flowchart showing an operation procedure of the auxiliary device in batch transmission.

In this flowchart, the auxiliary device monitors whether a request to perform distributed processing of transcoding is made from the recording device (step S21). If the request is made, the auxiliary device acquires numbers m and n (step S22), and receives F(m+1) to F(n) (step S23). The auxiliary device initializes variable j to m+1, and executes a loop of steps S25 to S30.

This loop is performed by making judgments of steps S25 to S27, transcoding F(j), and writing a transcoding result to the RAM.

Step S25 is a judgment as to whether the current time is within the reserved time period or not. If the current time is not within the reserved time period, the auxiliary device ends the procedure of this flowchart.

Step S26 is a judgment as to whether the digital electric appliance original processing has started. If the digital electric appliance original processing has started, the auxiliary device ends the procedure of this flowchart.

Step S27 is a judgment as to whether a power-off operation is performed. If a power-off operation is performed, the auxiliary device ends the procedure of this flowchart.

Step S29 is a judgment as to whether variable j reaches n. If variable j reaches n, the auxiliary device transmits T(F(m+1)) to T(F(n)) on the RAM to the recording device (step S30), and ends the procedure. Otherwise, the auxiliary device increments variable j (step S31).

FIG. 15 is a flowchart showing an operation procedure of the auxiliary device in handshake transmission. In this flowchart, the auxiliary device monitors whether a request to perform distributed processing of transcoding is made from the recording device (step S21). If the request is made, the auxiliary device obtains numbers m and n (step S22). The auxiliary device initializes variable j to n, and executes a loop of steps S25 to S30.

This loop is performed by waiting for reception of coded piece F(j) (step S33), performing the same judgments as in FIG. 14 (steps S25 to S27) upon reception, transcoding F(j), and writing a transcoding result to the RAM (step S2.8). Thus, each time transcoding is performed, the auxiliary device transmits a response indicating the acquisition of T(F(j)) to the recording device (step S34), and returns to step S33 through judgments of steps S35 and S37.

Step S35 is a judgment as to whether updated scheduled number m is received. If updated scheduled number m is received, the auxiliary device updates number m, and moves to step S37 (step S36).

Step S37 is a judgment as to whether variable j reaches m+1. If variable j reaches m+1, the auxiliary device transmits T(F(m+1)) to T(F(n)) on the RAM to the recording device, and ends the procedure (step S30). Otherwise, the auxiliary device decrements variable j (step S38).

Figure 16:
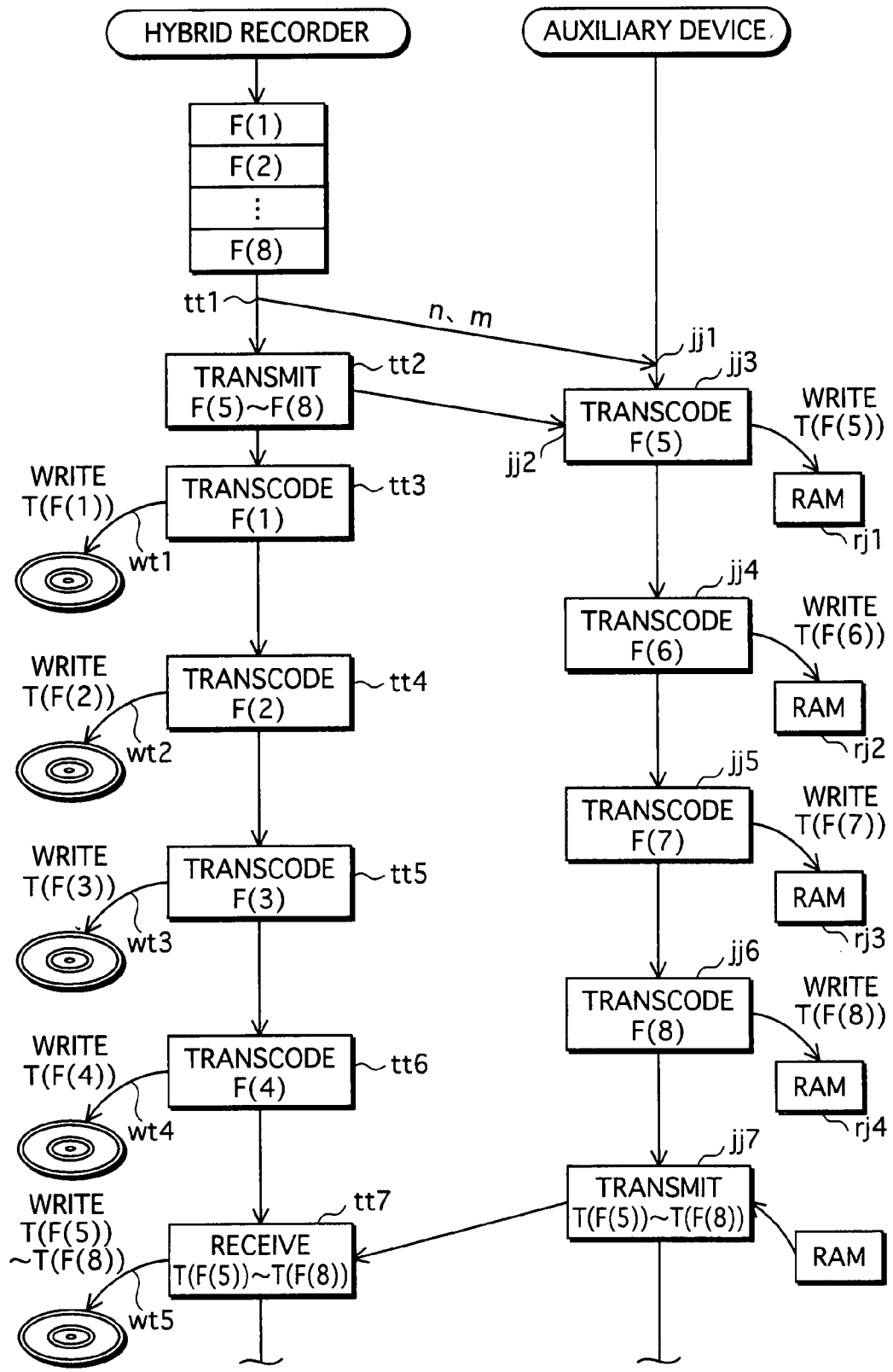
FIG. 16 is a sequence chart showing a sequence between both devices, with specific values such as i=1, 2, 3, 4 and j=8, 7, 6, 5 being assigned to the flowcharts of FIGS. 6 and 14.

In the flowchart of FIG. 6 showing batch transmission, the recording device executes the series of processes that are the transmission of n and m, the transmission of F(j), the transcoding of F(i), and the reception of T(F(j)). In the flowchart of FIG. 14, the auxiliary device executes the series of processes that are the reception of n and m, the transcoding of F(j), and the transmission of T(F(j)). FIG. 16 shows a sequence between these devices, with specific values i=1, 2, 3, 4 and j=5, 6, 7, 8 being assigned to these flowcharts of FIGS. 6 and 14.

Since i=1, 2, 3, 4, after transmitting n and m (tt1), the recording device transmits F(5) to F(8) (tt2), and then sequentially performs the transcoding of F(1) (tt3), the transcoding of F(2) (tt4), the transcoding of F(3) (tt5), and the transcoding of F(4) (tt6). Each time transcoding is performed, the recording device writes an obtained transcoding result out of T(F(1)) to T(F(4)) to the target medium (DVD) (wt1 to wt4). Lastly, the recording device receives T(F(5)) to T(F(8)) (tt7), and writes T(F(5)) to T(F(8)) to the target medium (DVD) (wt5).

Since j=5, 6, 7, 8, after receiving n and m (jj1), the auxiliary device receives F(5) to F(8) (jj2), and then sequentially performs the transcoding of F(S) (jj3), the transcoding of F(6) (jj4), the transcoding of F(7) (jj5), and the transcoding of F(8) (jj6). Each time transcoding is performed, the auxiliary device temporarily holds an obtained transcoding result out of T(F(5)) to T(F(8)) onto the RAM (rj1 to rj4).

After this, the auxiliary device transmits T(F(8)) to T(F(5)) on the RAM to the recording device (jj7).

Figure 17:
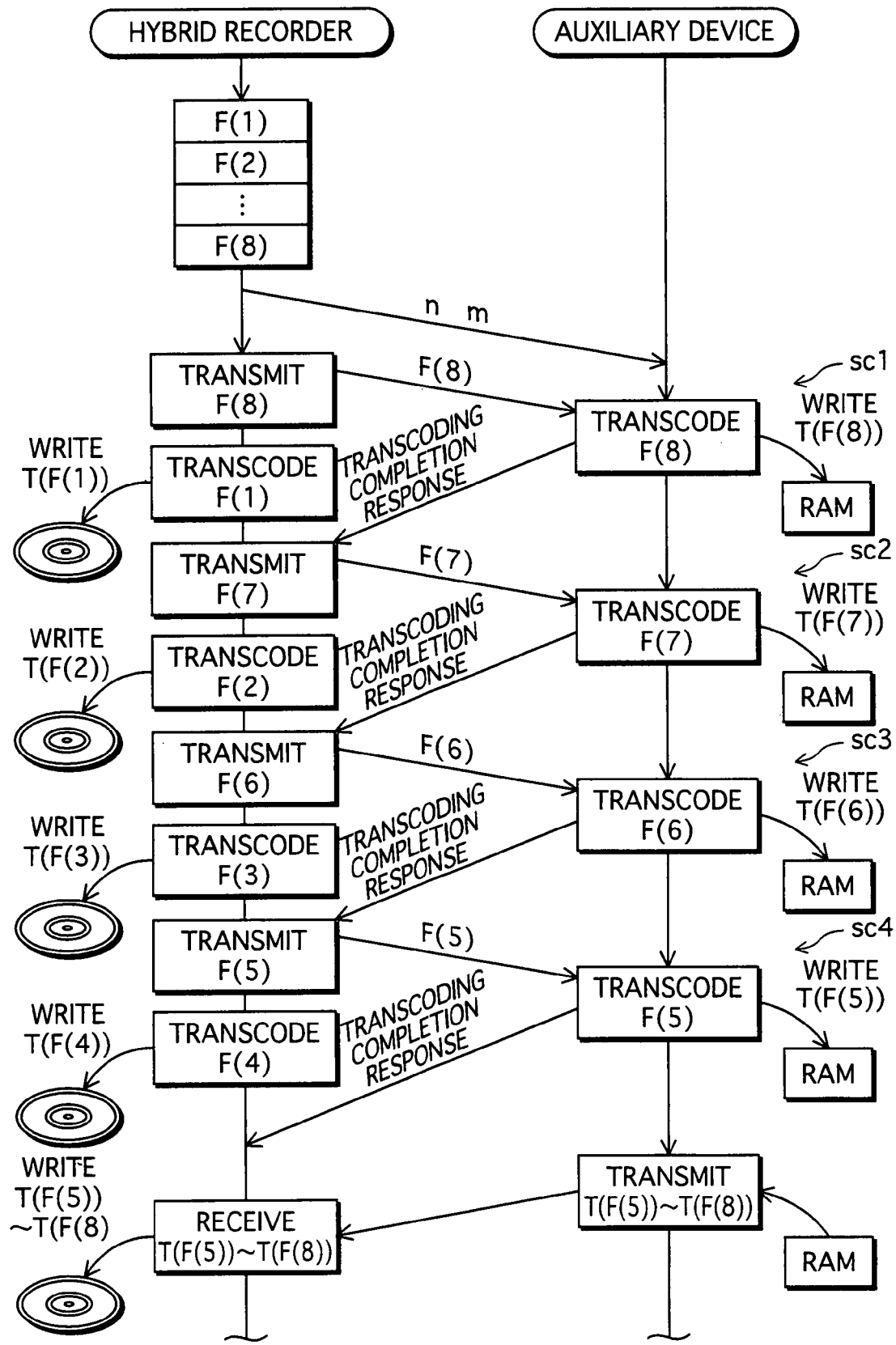
FIG. 17 is a sequence chart showing a sequence between both devices, with specific values such as i=1, 2, 3, 4 and j=8, 7, 6, 5 being assigned to the flowcharts of FIGS. 7 and 15.

In the flowchart of FIG. 7 showing handshake transmission, the recording device executes the series of processes that are the transmission of F(j), the transcoding of F(i), and the increment/decrement of j←j−1 and i i←−1. On the other hand, the auxiliary device executes the series of processes that are the reception of F(j), the transcoding of F(j), and the transcoding completion response. FIG. 17 shows a sequence between these devices when i=1, 2, 3, 4, and j=8, 7, 6, 5. FIG. 17 includes a sequence sc1 where i=1 and j=8, a sequence sc2 where i=2 and j=7, a sequence sc3 where i=3 and j=6, and a sequence sc4 where i=4 and j=5. FIG. 17 is the same as FIG. 16 in that the transmission/reception of n and m and the transmission/reception of T(F(5)) to T(F(8)) are conducted respectively before and after these sequences.

Figure 18:
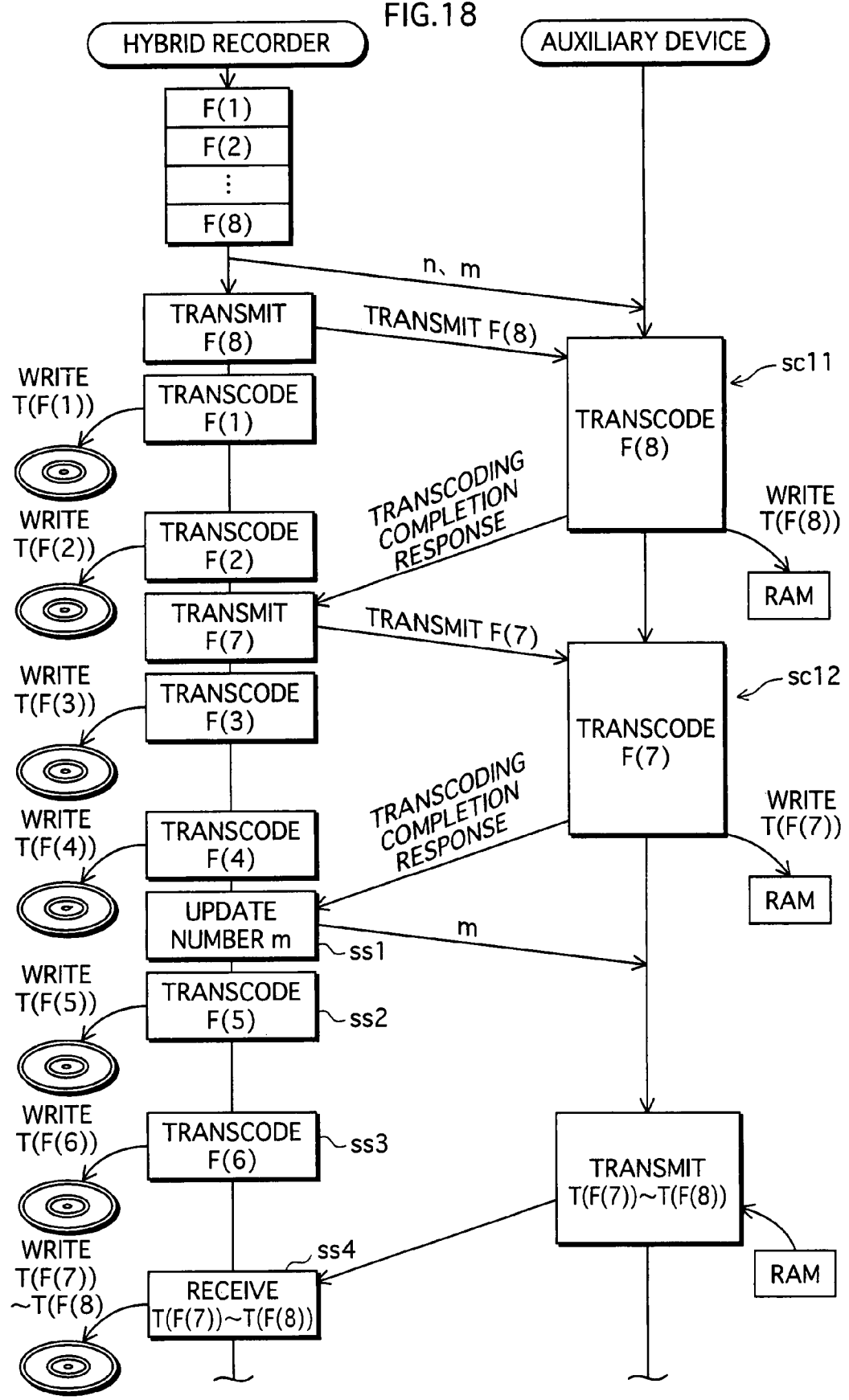
FIG. 18 is a sequence chart when updating the scheduled number.

If the transcoding by the auxiliary device is slower than that of the recording device, the recording device will not transmit a next coded piece unless it receives a transcoding completion response from the auxiliary device. This being so, the recording device repeats the sequence of the transmission of F(j), the transcoding of F(i), the transcoding of F(i−1), and the reception of a transcoding completion response. When the transcoding by the recording device reaches the scheduled number, the recording device updates the scheduled number, in order to process part of the coded pieces originally allocated to the auxiliary device, on the recording device side. FIG. 18 is a sequence chart when the scheduled number is updated. This sequence chart includes a sequence sc11 where j=8 and i=1, 2, and a sequence sc12 where j=7 and i=3, 4. After executing these sequences, the recording device updates scheduled number m and transits it to the auxiliary device (ss1), transcodes F(5) and F(6) (ss2, ss3), and receives T(F(7)) and T(F(8)) (ss4).

As described above, according to this embodiment, the recording device and the auxiliary device execute the transcoding of each coded piece and the writing of a transcoding result of each coded piece in parallel. Therefore, while the auxiliary device is performing transcoding, the recording device can obtain its own transcoding results on a target recording medium. Since the recording device writes its own transcoding results during when the auxiliary device is performing transcoding, the auxiliary device can write its own transcoding results to the target medium as soon as the writing of the transcoding results by the recording device ends. The writing of the transcoding results by the auxiliary device is conducted at an early stage, so that the transcoding results by both devices can be obtained on a single target medium speedily. Hence an operation of copying between media, that involves transcoding, can be accelerated.

SECOND EMBODIMENT

In the first embodiment, the auxiliary device transmits its own transcoding results to the recording device and the recording device writes the received transcoding results. In the second embodiment, on the other hand, the auxiliary device writes its own transcoding results to the target medium.

To realize such writing by the auxiliary device, the recording device, upon the completion of the writing of its own transcoding results, transmits write destination information to the auxiliary device. The write destination information contains a file path and a file pointer.

The file path is information uniquely identifying, in the network, a location of a file on the target medium mounted on the recording device.

The file pointer shows an address immediately following an address to which the recording device has written a transcoding result. The recording device transmits such a file path and file pointer to the auxiliary device, and the auxiliary device writes transcoding results to the target medium according to the file path and the file pointer, as a result of which transcoding results can be written into one file without fragmentation.

Such writing is advantageous when the target medium is a recording medium that can only be written sequentially, such as a DVD-R.

(Modifications)

The above description by no means represents all embodiments of the present invention. The present invention can be realized with any of the following modifications (A), (B), (C), (D), . . . .

(A) The information processing shown in the flowcharts and the information processing executed by the functional construction elements in the above embodiments are actually realized by hardware resources. In this sense, the information processing can be regarded as the creation of a technical idea utilizing natural laws. Hence these information processing meets the requirement as an "invention of a program".

<Production of the Program According to the Present Invention>

The program according to the present invention can be produced in the following manner. First, a software developer creates source programs which realize the above flowcharts and functional construction elements using a programming language. When doing so, the software developer creates such source programs that realize the above flowcharts and functional construction elements, using class structures, variables, array variables, and calls for external functions according to a syntax of the programming language.

In detail, an iterative process in the flowcharts is described using, for example, a for statement defined by the above syntax. A judgment process is described using an if statement, a swith statement, or the like defined by the above syntax. Control for hardware, such as playback control of a decoder or access control of a drive device, is described by calling an external function supplied from a manufacturer of the hardware.

The created source programs are supplied to a compiler as files. The compiler translates these source programs to generate object programs.

The translation by the compiler is made up of processes such as syntax analysis, optimization, resource assignment, and code generation. In the syntax analysis, lexical analysis, syntax analysis, and semantic analysis of the source programs are performed to convert the source programs to intermediate programs. In the optimization, operations such as basic blocking, control flow analysis, and data flow analysis are performed on the intermediate programs. In the resource assignment, variables in the intermediate programs are assigned to registers or memories in a target processor, in order to adapt to an instruction set of the target processor. In the code generation, each intermediate instruction in the intermediate programs is converted to program code to thereby obtain the object programs.

The object programs generated in this way are made up of one or more pieces of program code for causing a computer to execute the individual steps of the flowcharts or functional construction elements in the above embodiments. There are various types of program code such as a processor's native code or JAVA byte code. Also, there are various methods for realizing the individual steps by program code. If each step can be realized using an external function, a call statement for calling the external function serves as program code. Also, there is a case where program code for realizing one step belongs to separate object programs. For an RISC processor which has a limited set of instructions, each step of the above flowcharts may be realized by combining an arithmetic instruction, a logic instruction, a branch instruction, and the like.

Having generated the object programs, a programmer activates a linker for the object programs. The linker assigns the object programs and relevant library programs to memory areas and links them together to generate a load module. Such a generated load module is assumed to be read by a computer, and causes the computer to execute the procedures of the flowcharts and the procedures of the functional construction elements in the above embodiments. As a result of the above processes, the program according to the present invention can be produced.

<Example of Use of the Program According to the Present Invention>

The program according to the present invention can be used as follows.

(i) Use as an Embedded Program

When using the program according to the present invention as an embedded program, the load module which is the program is written to an instruction ROM together with a basic input/output program (BIOS) and various types of middleware (operation system). The instruction ROM is then incorporated in a control unit and executed by a CPU. In this way, the program according to the present invention can be used as a control program of the recording device.

(ii) Use as an Application

When the recording device is equipped with a hard disk, the basic input/output program (BIOS) is included in an instruction ROM, and various types of middleware (operation system) are preinstalled in the hard disk. Also, a boot ROM for activating a system from the hard disk is provided in the recording device.

In this case, only the load module is supplied to the recording device via a portable recording medium or a network, and installed in the hard disk as one application. As a result, the recording device performs bootstrapping by the boot ROM to start the operation system, and has the CPU execute the application. In this way, the program according to the present invention is used.

The recording device equipped with a hard disk can use the program according to the present invention as one application. Therefore, the program according to the present invention can independently be assigned, leased, or provided via a network.

(B) The system LSI according to the present invention can be produced and used in the following way.

A system LSI is a circuit generated by mounting bare chips on a high-density substrate and packaging them. The system LSI includes a construction in which a plurality of bare chips have an external structure like one LSI, by mounting the plurality of bare chips on a high-density substrate and packaging them (such a system LSI is called a multi-chip module).

There are two types of packaging for a system LSI, i.e. QFP (Quad Flat Package) and PGA (Pin Grid Array). QFP is a system LSI with pins being attached to four side faces of a package. PGA is a system LSI with a large number of pins being attached to an entire bottom surface.

There pins serve as an input/output interface to a drive device, an input interface to a remote control device, an interface to a television, an IEEE 1394 interface, an interface to a PCI bus, and the like. Since pins in a system LSI have such interface functions, the system LSI can act as a core part of the hybrid recorder 100 when the circuits of the hybrid recorder 100, the drive device, and the like are connected to the pins of the system LSI.

The bare chips packaged in the system LSI are an instruction ROM, a CPU, a decoder LSI, and the like that realize the functions of each construction element shown in the internal structure diagrams in the above embodiments.

As mentioned earlier in the above "use as an embedded program" section, the load module which corresponds to the program, the basic input/output program (BIOS), and the various types of middleware (operation system) are written in the instruction ROM. Since the above embodiments especially relate to the production of the load module which corresponds to the program, the system LSI according to the present invention can be produced by packaging the instruction ROM storing the load module which corresponds to the program as a bare chip.

Details of the production procedure are as follows. First, a circuit diagram of a part that is to be formed as a system LSI is created based on the structure diagrams shown in the above embodiments.

Having implemented each construction element, buses connecting circuit components, ICs, and LSIs, peripheral circuits, external interfaces, and the like are specified. Furthermore, connecting lines, power supply lines, ground lines, clock signal lines, and the like are specified. In this specification process, the circuit diagram is established while making adjustments, such as ensuring a bandwidth necessary for each construction element and adjusting an operation timing of each construction element in consideration of LSI specifications.

Once the circuit diagram has been completed, packaging design is carried out. The packaging design is a board layout creation operation for determining where, on a board, to position components (circuits components, ICs, LSIs) shown on the circuit diagram created by the circuit design or how to route, on the board, connecting lines shown on the circuit diagram.

The packaging design is composed of automatic placement and automatic routing.

In the case of using a CAD device, the automatic placement can be realized by using a dedicated algorithm called "centroid method". The automatic routing specifies such connecting lines that connect pins of components on the circuit diagram to each other, using metal foil and vias. In the case of using a CAD device, this routing process can be achieved by using a dedicated algorithm called "maze method" or "line search method".

Having performed the above packaging design and determined the layout on the board, a result of the packaging design is converted to CAM data and output to facilities such as an NC machine tool. The NC machine tool performs SoC implementation or SiP implementation based on this CAM data. SoC (System on Chip) is a technique of integrating multiple circuits into a single chip. SiP (System in Package) is a technique of combining multiple chips into a single package using a resin or the like. Through the above processes, the system LSI according to the present invention can be produced based on the internal structure diagrams of the hybrid recorder 100 shown in the above embodiments.

An integrated circuit generated in the above manner is called an IC, an LSI, a super LSI, or an ultra LSI, depending on the integration degree.

Further, some or all of the construction elements of the hybrid recorder 100 may be implemented as one chip. Also, the integration is not limited to the above SoC and SiP, but may be performed using a dedicated circuit or a general process. A FPGA (Field Programmable Gate Array) that can be programmed or a reconfigurable processor capable of reconfiguring connections and settings of circuit cells in an LSI may be used after producing the LSI. Also, if an integrated circuit technique that replaces an LSI emerges from advancement of semiconductor technology or other derivative technology, such a technique can be used for the integration of the functional blocks. For instance, biotechnology may be adapted in this way.

(C) The above embodiments describe the case where the HD is used as the source medium in the hybrid recorder 100.

However, the physical properties of the HD do not particularly contribute to the achievement of the operations and effects of the present invention. The present invention is applicable to any other recording medium that has a capacity of recording a broadcast program like the HD. Examples of such a recording medium include: an optical disc such as a DVD-R, a DVD-RW, a DVD-RAM, a DVD+R, a DVD+RW, a CD-R, a CD-RW, or a Blu-ray Disc; or a magneto-optical disk such as a PD or an MO.

Also, though the above embodiments describe the case where the DVD or the SD memory card is used as the target medium, the present invention is equally applicable to a semiconductor memory card such as a CompactFlash card, a SmartMedia card, a Memory Stick card, a MultiMediaCard, or a PCMCIA card; a magnetic disk such as a flexible disk, SuperDisk, Zip, or Clik!; and a removable hard disk drive such as ORB, Jaz, SparQ, SyJet, EZFley, or Microdrive.

(D) The digital stream in each of the above embodiments may be a digital stream obtained by encoding an analog video signal broadcast by analog broadcasting.

Alternatively, an analog/digital video signal recorded on a videotape may be encoded to obtain a digital stream. Also, an analog/digital video signal directly captured by a video camera may be encoded to obtain a digital stream. A digital work such as a movie distributed recorded on a recording medium or a digital work distributed by a distribution server is applicable too.

(E) In the case where copy generation information (CGI) is embedded in the digital stream, it is desirable to perform the backup from the HD to the DVD based on this copy generation information. The copy generation information includes "copy free" indicating that copying can be performed freely, "one generation copy" indicating that only a one-generation copy is permitted to be recorded, "no more copy" indicating that copying of a copy is prohibited, and "never copy" indicating that no copying is permitted. Only when the copy generation information embedded in the digital stream is "copy free" or "one generation copy", the backup from the HD to the DVD is performed. When the copy generation information is "no more copy" or "never copy", meanwhile, the backup is not performed.

(F) In the case where right management information is added to the digital stream, it is desirable to perform the backup from the HD to the DVD under a use condition defined by the right management information. If a copy permission condition is specified as a number of copies in the right management information, the backup is performed under this condition. If the copy permission condition is specified as a valid period (by year, month, and day), the backup is performed under this condition.

(G) When there are variations of copying such as move, migrate, and checkout, the backup may be performed based on a use condition defined for each variation. Move is a copy operation that involves deletion of a copy-source digital stream, and is used when moving a digital stream between a plurality of recording media.

Migrate is a copy operation which is based on a precondition that use condition information is generated on a copy-destination recording medium.

Checkout is a copy operation that is limited in number. In the checkout, the digital stream is copied after decrementing the number of permitted copies. The difference between the checkout and a general type of copying limited in number is that the number of permitted copies can be incremented in the checkout. The increment of the number of permitted copies is performed after a process (called "checkin") of disabling playback of a digital stream which has been recorded on a recording medium by copying.

(H) The above embodiments describe the case where transcoding is distributed between two devices, but transcoding may be distributed among three or more devices. In such a case, the same effects as the first and second embodiments can be achieved by two of the devices.

(I) The above embodiments describe the case where the target medium is mounted on the recording device, but the target medium may be mounted on a third device different from the recording device and the auxiliary device. In this case, the recording device and the auxiliary device access the third device to write transcoding results.

As an alternative, the target medium may be mounted on the auxiliary device.

(J) The above embodiments describe the case where the recording device and the auxiliary device are connected to each other by IEEE-1394, but the recording device and the auxiliary device may instead be connected to each other by an optical fiber to thereby implement the system according to the present invention as a Cell computing system.

The interconnection by the optical fiber enables to reduce the latency of the interdevice communications to as close to 0 as possible. Hence the efficiency of the transcoding distribution can be further enhanced.

(K) The above embodiments describe the case where the auxiliary device performs transcoding using a transcoder realized by software. However, if a decoder realized by hardware is installed on the digital television 200 or the game machine 300, transcoding may be performed using such a decoder function.

INDUSTRIAL APPLICABILITY

The above embodiments each disclose the internal structure of the recording device to which the present invention relates, and the recording device can be manufactured in volume based on the disclosed internal structure. In other words, the receiving device is capable of being industrially used. Hence the recording device according to the present invention has industrial applicability.

The invention claimed is:

1. A recording device of a system that performs transcoding on a plurality of coded pieces through distributed processing between the recording device and an auxiliary device, a sequence of the plurality of coded pieces forming a digital stream which is played back along a playback time axis, the recording device comprising:

a transcoding unit operable to transcode at least coded pieces forming, from among a former half and a latter half of the digital stream obtained by dividing the digital stream at a predetermined point on the playback time axis, the former half of the digital stream;

a transmission unit operable to transmit, to the auxiliary device, coded pieces which form the latter half of the digital stream; and a writing unit operable to write results of the transcoding performed by the transcoding unit onto a single recording medium, wherein, for results of transcoding the former half and simultaneously with the transcoding unit transcoding one of the coded pieces of the former half, the writing unit writes a result of the transcoding unit transcoding a coded piece immediately preceding the of the coded pieces in the digital stream onto the single recording medium, and wherein, for results of transcoding the latter half and after the writing unit writing all of the results of the transcoding unit transcoding the former half onto the single recording medium, the writing unit (i) receives results of the auxiliary device transcoding the latter half from the auxiliary device and (ii) writes the received results of the auxiliary device transcoding the latter half onto the single recording medium.

2. The recording device of claim 1, further comprising:
an allocation unit operable to allocate coded pieces forming the former half of the digital stream to the recording device, and allocate coded pieces forming the latter half of the digital stream to the auxiliary device,
wherein the transmission unit transmits, to the auxiliary device, the coded pieces forming the latter half of the digital stream in such a sequence that (i) a last coded piece of the latter half is transmitted first, and (ii), after transmitting the last coded piece of the latter half, each of a plurality of coded pieces preceding the last coded piece is transmitted sequentially, and
wherein the transcoding unit transcodes the coded pieces forming the former half of the digital stream, in sequence from a top coded piece.

3. The recording device of claim 2,
wherein the allocation unit sets a transcoding target for the recording device and a transcoding target for the auxiliary device, and notifies the auxiliary device of the transcoding target for the auxiliary device,
wherein the recording device further comprises a judgment unit operable to judge, when the recording device has reached the transcoding target for the recording device, whether the auxiliary device has reached the transcoding target for the auxiliary device, and
wherein the transcoding unit transcodes a coded piece that follows the transcoding target for the recording device, when the auxiliary device has not reached the transcoding target for the auxiliary device.

4. The recording device of claim 1, wherein the recording device judges whether a digital electric appliance of the system has a copyright protection function, and recognizes the digital electric appliance as the auxiliary device when the digital electric appliance has the copyright protection function.

5. The recording device according to any one of claims 1-4, wherein the digital stream includes picture data and audio frames which are played back along the playback time axis.

6. A system performing transcoding on a plurality of coded pieces through distributed processing between a recording device and an auxiliary device, a sequence of the plurality of coded pieces forming a digital stream which is played back along a playback time axis,
wherein the system includes the recording device and the auxiliary device,
wherein the recording device includes:
a transcoding unit operable to transcode at least coded pieces forming, from among a former half and a latter half of the digital stream obtained by dividing the digital stream at a predetermined point on the playback time axis, the former half of the digital stream;
a transmission unit operable to transmit, to the auxiliary device, coded pieces which form the latter half of the digital stream; and
a writing unit operable to write results of the transcoding performed by the transcoding unit onto a single recording medium,
wherein, for results of transcoding the former half and simultaneously with the transcoding unit transcoding one of the coded pieces of the former half, the writing unit writes a result of the transcoding unit transcoding a coded piece immediately preceding the one of the coded pieces in the digital stream onto the single recording medium, and
wherein, for results of transcoding the latter half and after the writing unit writing all of the results of the transcoding unit transcoding the former half onto the single recording medium, the writing unit (i) receives results of the auxiliary device transcoding the latter half from the auxiliary device and (ii) writes the received results of the auxiliary device transcoding the latter half onto the single recording medium.

7. The system of claim 6,
wherein the auxiliary device is a digital electric appliance which is one of a game machine and a digital television,
wherein the auxiliary device is provided with a transcoding function, and
wherein the auxiliary device performs transcoding when original processing of a corresponding one of the game machine and the digital television is not being performed.

8. The system of claim 6, wherein the auxiliary device starts transcoding when powered on by a user, and stops transcoding when powered off by the user.

9. The system of claim 6,
wherein the auxiliary device is a digital electric appliance including a reservation unit operable to receive a processing reservation,
wherein the digital electric appliance is one of a game machine and a digital television,
wherein the auxiliary device performs transcoding during a time for which the processing reservation has been made, and
wherein, when a user requests original processing of a corresponding one of the game machine and the digital television during the time for which the processing reservation has been made, the auxiliary device does not perform the original processing.

10. The system according to any one of claims 6-9, wherein the digital stream includes picture data and audio frames which are played back along the playback time axis.

11. An integrated circuit of a system that performs transcoding on a plurality of coded pieces through distributed processing between a recording device and an auxiliary device, the integrated circuit causing the recording device to write results of transcoding through distributed processing onto a single recording medium, a sequence of the plurality of coded pieces forming a digital stream which is played back along a playback time axis, the integrated circuit comprising:
a transcoding unit operable to transcode at least coded pieces forming, from among a former half and a latter half of the digital stream obtained by dividing the digital stream at a predetermined point on the playback time axis, the former half of the digital stream;
a transmission unit operable to transmit, to the auxiliary device, coded pieces which form the latter half of the digital stream; and
a control unit operable to control a writing of results of the transcoding performed by the transcoding unit onto the single recording medium,
wherein, for results of transcoding the former half and simultaneously with the transcoding unit transcoding one of the coded pieces of the former half, the control unit writes a result of the transcoding unit transcoding a coded piece immediately preceding the one of the coded pieces in the digital stream onto the single recording medium, and wherein, for results of transcoding the latter half and after all of the results of the transcoding unit transcoding the former half onto the single recording medium, the control unit (i) receives results of the auxiliary device transcoding the latter half from the auxiliary device and (ii) writes the received results of the auxiliary device transcoding the latter half onto the single recording medium.

12. The integrated circuit of claim 11, wherein the digital stream includes picture data and audio frames which are played back along the playback time axis.

13. A non-transitory computer-readable recording medium having a program recorded thereon, the program causing a computer to execute a recording method in a system that performs transcoding on a plurality of coded pieces through distributed processing between the computer and another computer, a sequence of the plurality of coded pieces forming a digital stream which is played back along a playback time axis, the recording method comprising steps of:

transcoding at least coded pieces forming, from among a former half and a latter half of the digital stream obtained by dividing the digital stream at a predetermined point on the playback time axis, the former half of the digital stream;

transmitting, to the other computer, coded pieces which form the latter half of the digital stream; and writing results of the transcoding performed by the transcoding step onto a single recording medium, wherein, for results of transcoding the former half and simultaneously with the transcoding step transcoding one of the coded pieces of the former half, the writing step writes a result of the transcoding step transcoding a coded piece immediately preceding the one of the coded pieces of digital stream onto the single recording medium, and wherein, for results of transcoding the latter half and after the writing step writes all of the results of the transcoding step transcoding the former half onto the single recording medium, the writing step (i) receives results of the other computer transcoding the latter half from the other computer and (ii) writes the received results of the other computer transcoding the latter half onto the single recording medium.

14. The non-transitory computer-readable recording medium according to claim 13, wherein the digital stream includes picture data and audio frames which are played back along the playback time axis.

15. A recording method of using a recording device of a system that performs transcoding on a plurality of coded pieces through distributed processing between a computer and another computer, the recording method being for recording results of transcoding by the computer and the other computer onto a single recording medium, a sequence of the plurality of coded pieces forming a digital stream which is played back along a playback time axis, the recording method comprising steps of:

transcoding at least coded pieces forming, from among a former half and a latter half of the digital stream obtained by dividing the digital stream at a predetermined point on the playback time axis, the former half of the digital stream;

transmitting, to the other computer, coded pieces which form the latter half of the digital stream;and writing results of the transcoding performed by the transcoding step onto the single recording medium, wherein, for results of transcoding the former half and simultaneously with the transcoding step transcoding one of the coded pieces of the former half, the writing step writes a result of the transcoding step transcoding a coded piece immediately preceding the one of the coded pieces of the digital stream onto the single recording medium, and wherein, for results of transcoding the latter half and after the writing step writes all of the results of the transcoding step transcoding the former half onto the single recording medium, the writing step (i) receives results of the other computer transcoding the latter half from the other computer and (ii) writes the received results of the other computer transcoding the latter half onto the single recording medium.

16. The recording method according to claim 15, wherein the digital stream includes picture data and audio frames which are played back along the playback time axis.

* * * * *